(12) United States Patent  
Endo et al.

(10) Patent No.: US 6,603,407 B2  
(45) Date of Patent: Aug. 5, 2003

(54) MAP DISPLAY APPARATUS

(75) Inventors: Yoshinori Endo, Mito (JP); Toshio Fujiwara, Hitachi (JP); Hiroshi Shojima, Kashiwa (JP); Motoki Hirano, Tokyo (JP); Kaoru Harada, Yokohama (JP); Tetsumori Aikawa, Sagamihara (JP)

(73) Assignees: Hitachi, Ltd., Tokyo (JP); Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/932,951

(22) Filed: Aug. 21, 2001

(65) Prior Publication Data

US 2002/0011941 A1 Jan. 31, 2002

Related U.S. Application Data

(60) Continuation of application No. 09/320,556, filed on May 27, 1999, now Pat. No. 6,278,383, which is a division of application No. 08/636,767, filed on Apr. 19, 1996, now Pat. No. 5,917,436.

(30) Foreign Application Priority Data

Apr. 20, 1995 (JP) ............................................. 7-094772

(51) Int. Cl.$^7$ ............................................. G08G 1/123
(52) U.S. Cl. ........................ 340/995; 340/988; 340/990
(58) Field of Search ................................ 340/990, 995, 340/996, 988, 991; 701/201, 202, 209, 211, 212

(56) References Cited

U.S. PATENT DOCUMENTS

| | | | |
|---|---|---|---|
| 4,963,865 A | 10/1990 | Ichikawa et al. | 340/995 |
| 5,115,398 A | 5/1992 | De Jong | 340/995 |
| 5,161,886 A | 11/1992 | De Jong | 340/995 |
| 5,297,051 A | 3/1994 | Arakawa et al. | 340/995 |
| 5,299,300 A | 3/1994 | Femal et al. | 340/995 |
| 5,377,102 A | 12/1994 | Nishiishigaki | 340/990 |
| 5,412,573 A | 5/1995 | Barnea et al. | 701/211 |
| 5,420,582 A | 5/1995 | Kubbat et al. | 340/974 |
| 5,448,696 A | 9/1995 | Shimada et al. | 345/357 |
| 5,566,073 A | 10/1996 | Margolin | 340/995 |
| 5,573,402 A | 11/1996 | Gray | 434/69 |
| 5,602,564 A | 2/1997 | Iwamura et al. | 345/340 |
| 5,618,179 A | 4/1997 | Copperman et al. | 434/69 |
| 5,732,385 A | 3/1998 | Nakayama et al. | 340/995 |
| 5,748,109 A * | 5/1998 | Kosaka et al. | 340/995 |
| 5,793,310 A * | 8/1998 | Watanabe et al. | 340/995 |
| 5,884,217 A * | 3/1999 | Koyanagi | 340/995 |
| 5,941,932 A * | 8/1999 | Aikawa et al. | 340/995 |

FOREIGN PATENT DOCUMENTS

| | | |
|---|---|---|
| EP | 0242050 | 10/1987 |
| EP | 0378271 | 7/1990 |
| EP | 0660290 | 6/1995 |
| EP | 0678731 | 10/1995 |
| JP | 1-263688 | 10/1989 |
| JP | 2-244188 | 9/1990 |
| JP | 6-90041 | 11/1994 |
| JP | 7-160845 | 6/1995 |

OTHER PUBLICATIONS

Foley et al., *Computer Graphics*, pp. 111–127, Addison-–Wesley Publishing Company.

* cited by examiner

*Primary Examiner*—Van Trieu  
(74) *Attorney, Agent, or Firm*—Antonelli, Terry, Stout & Kraus, LLP

(57) ABSTRACT

A map display apparatus includes a map data memory which stores map data necessary for plotting a map of a predetermined region; a map display which reads map data out of the map data memory and plots a bird's-eye view display by projecting the map data read out from the map data memory onto a projection plane which makes a projection angle with a plane of the map data read out from the map data memory, the projection angle being greater than 0° and less than 90°, the bird's-eye view display including identifying marks which identify items in the bird's-eye view display; and an identifying mark overlap preventer which prevents identifying marks from overlapping one another in the bird's-eye view display.

49 Claims, 40 Drawing Sheets

FIG.3A
STEP 1
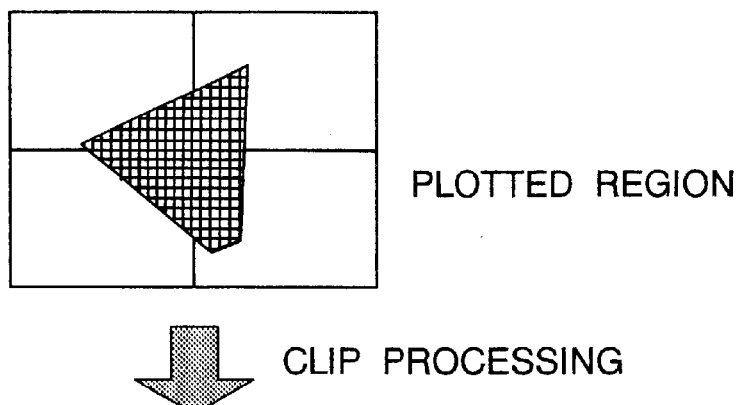
PLOTTED REGION
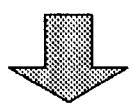
CLIP PROCESSING
FIG.3B
STEP 2
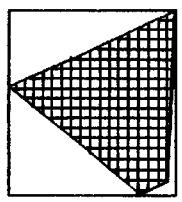
AFFINE CONVERSION
+
PERSPECTIVE CONVERSION
FIG.3C
STEP 3
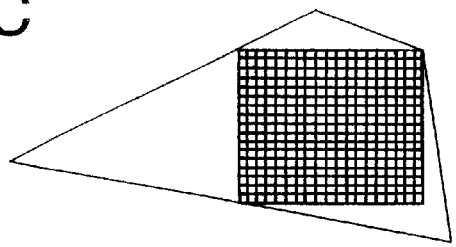
CLIP PROCESSING
FIG.3D
STEP 4
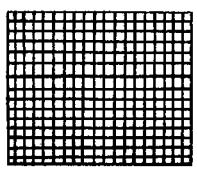
PLOTTING PROCESSING
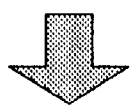

PERSPECTIVE CONVERSION CALCULATION

PLANE DATA PLOTTING PROCESSING

LINE DATA PLOTTING PROCESSING

FIG.14 CHARACTER DATA PLOTTING PROCESSING
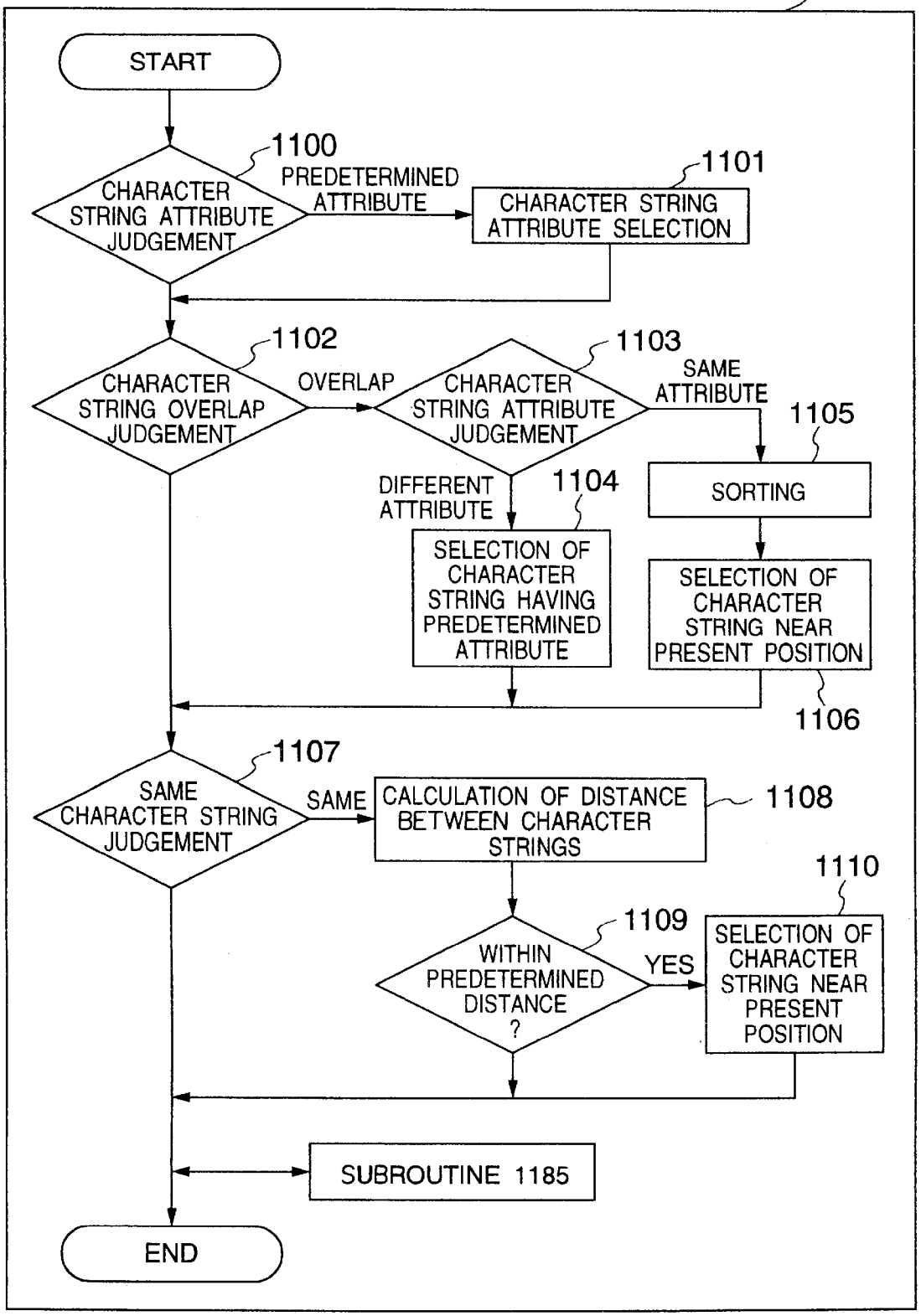

FIG. 16A

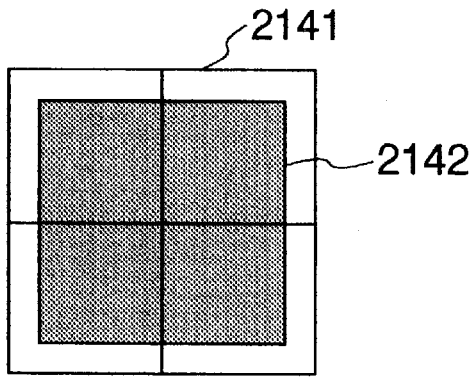

EXAMPLE OF EXPRESSING ONE CHARACTER BY PLURAL CHARACTERS

FIG. 16B

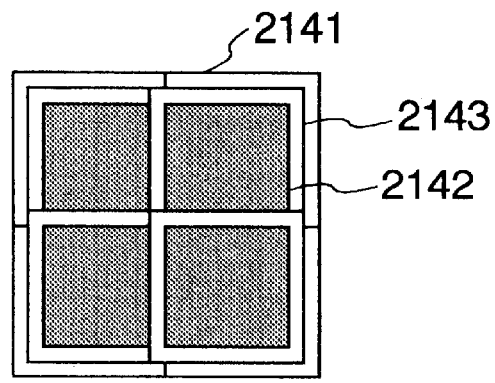

EXAMPLE OF FRINGING OF CHARACTER EXPRESSING ONE CHARACTER BY PLURAL CHARACTERS

FIG. 16C

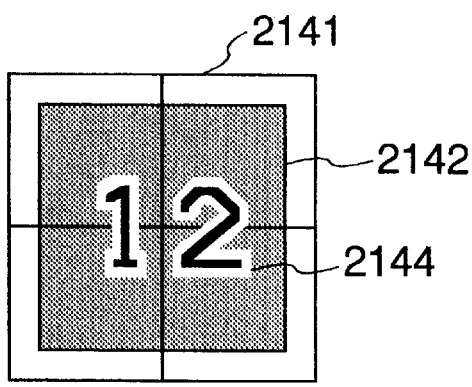

EXAMPLE OF DISPLAY OF FRINGED CHARACTER IN SUPERPOSITION WITH CHARACTER EXPRESSED BY PLURAL CHARACTERS

FIG. 16D

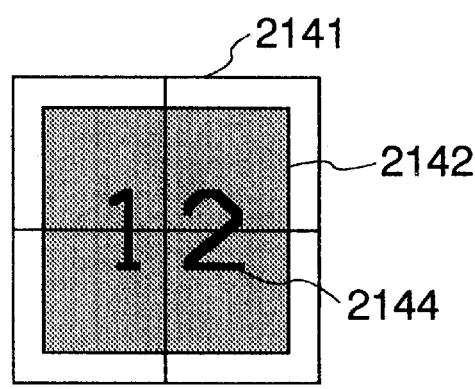

EXAMPLE OF CONTROL SO THAT CHARACTER WHICH OVERLAPS WITH CHARACTER EXPRESSED BY PLURAL CHARACTERS AND IS DESIGNATED TO BE FRINGED IS NOT FRINGED

CLIP PROCESSING SYSTEM IN STANDARD CHARACTER

CLIP PROCESSING SYSTEM IN HALF-SIZE CHARACTER

FIG.18A

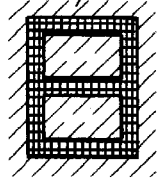

▦ PLOTTING COLOR
▨ BACKGROUND COLOR

FRINGED CHARACTER OF "日"

FIG.18B
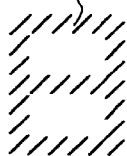
PLOTTING IN BACKGROUND COLOR AT POSITION DEVIATED BY ONE DOT TO UPWARD LEFT

⇒

FIG.18C
PLOTTING IN BACKGROUND COLOR AT POSITION DEVIATED BY ONE DOT UPWARD

⇒

FIG.18D
PLOTTING IN BACKGROUND COLOR AT POSITION DEVIATED BY ONE DOT TO UPWARD RIGHT

⇒

FIG.18E
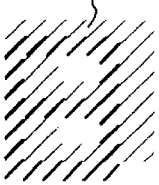
PLOTTING IN BACKGROUND COLOR AT POSITION DEVIATED BY ONE DOT TO LEFT

⇒

FIG.18F
PLOTTING IN BACKGROUND COLOR AT POSITION DEVIATED BY ONE DOT TO RIGHT

⇒

FIG.18G
PLOTTING IN BACKGROUND COLOR AT POSITION DEVIATED BY ONE DOT TO DOWNWARD LEFT

⇒

FIG.18H
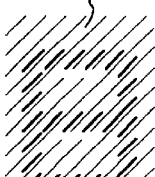
PLOTTING IN BACKGROUND COLOR AT POSITION DEVIATED BY ONE DOT DOWNWARD

⇒

FIG.18I
PLOTTING IN BACKGROUND COLOR AT POSITION DEVIATED BY ONE DOT TO DOWNWARD RIGHT

⇒

FIG.18J
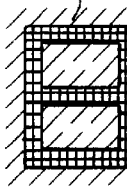
PLOTTING FINALLY IN PLOTTING COLOR

REGION DISPLAYED ON BIRD'S-EYE VIEW

VIEW POINT AND PROJECTION PLANE

RESULTING BIRD'S-EYE VIEW DISPLAY

REGION DISPLAYED ON BIRD'S-EYE VIEW

VIEW POINT AND PROJECTION ANGLE

RESULTING BIRD'S-EYE VIEW DISPLAY

EXAMPLE BEFORE PROCESSING $x2 \quad x1$
$\Delta x$

EXAMPLE AFTER PROCESSING

EXAMPLE OF CHARACTER STRINGS

EXAMPLE OF CHARACTER STRINGS

FIG.28A
EXAMPLE OF JUDGEMENT OF OVERLAPPING CHARACTER STRINGS
KAWAKOHARA
KAISUIYOKUJO
KENKOHOKEN
CENTER
FIG.28B
EXAMPLE OF JUDGEMENT OF OVERLAPPING CHARACTER STRINGS
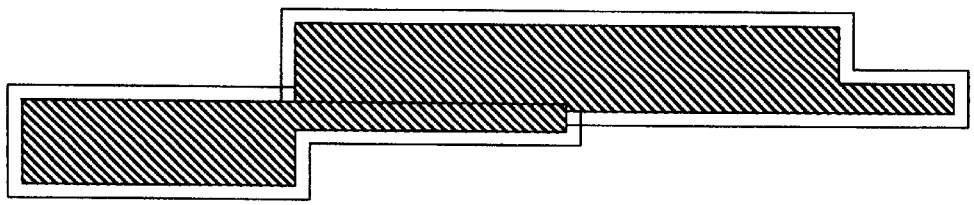
FIG.29A
EXAMPLE OF JUDGEMENT OF NON-OVERLAPPING CHARACTER STRINGS
KAWAKOHARA
KAISUIYOKUJO
KENKOHOKEN
CENTER
FIG.29B
EXAMPLE OF JUDGEMENT OF NON-OVERLAPPING CHARACTER STRINGS
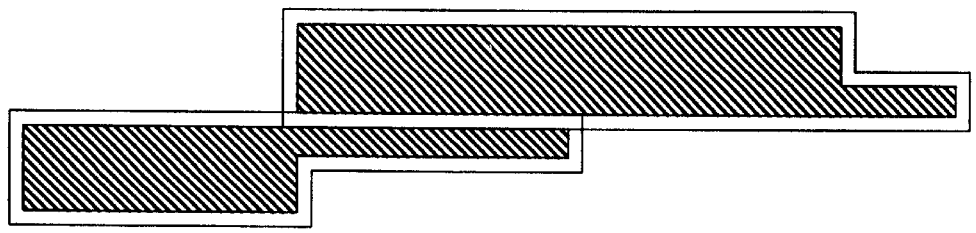

EXAMPLE OF CHARACTER STRINGS

CHARACTER STRING A

EXAMPLE OF CHARACTER STRINGS

CHARACTER STRING B

POLYGON CIRCUMSCRIBED WITH CHARACTER STRING

CHARACTER STRING A

OVERLAP JUDGEMENT REGION

POLYGON CIRCUMSCRIBED WITH CHARACTER STRING

CHARACTER STRING B

OVERLAP JUDGEMENT REGION

FIG.32A
EXAMPLE OF JUDGEMENT OF
OVERLAPPING CHARACTER STRINGS
KAWAKOHARA
KENKOHOKEN
KAISUIYOKUJO
CENTER
FIG.32B
EXAMPLE OF JUDGEMENT OF
OVERLAPPING CHARACTER STRINGS
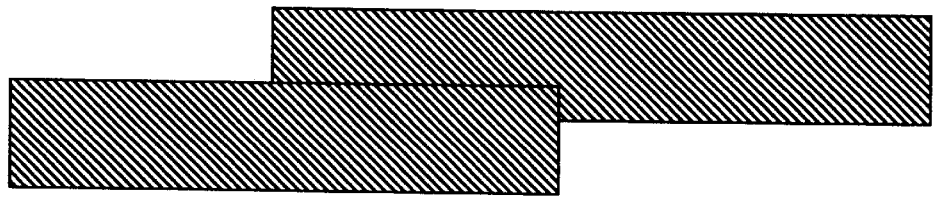
FIG.33A
EXAMPLE OF JUDGEMENT OF
NON - OVERLAPPING CHARACTER STRINGS
KAWAKOHARA
KAISUIYOKUJO
KENKOHOKEN
CENTER
FIG.33B
EXAMPLE OF JUDGEMENT OF
NON - OVERLAPPING CHARACTER STRINGS
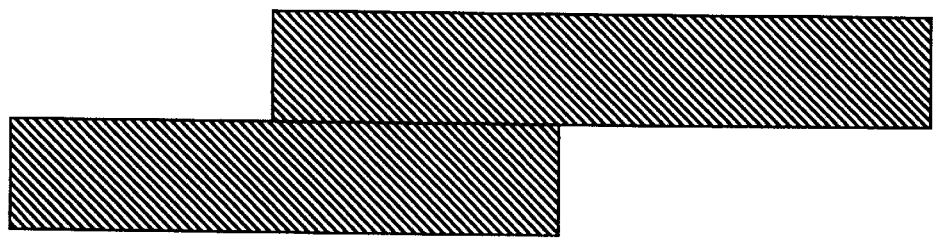

EXAMPLE OF CHARACTER STRINGS

POLYGON CIRCUMSCRIBED WITH CHARACTER STRING

EXAMPLE OF CHARACTER STRINGS

POLYGON CIRCUMSCRIBED WITH CHARACTER STRING

FIG.36A
EXAMPLE OF JUDGEMENT OF
OVERLAPPING CHARACTER STRINGS
K A W A K O H A R A
K A I S U I Y O K U J O
K E N K O H O K E N
C E N T E R
FIG.36B
EXAMPLE OF JUDGEMENT OF
OVERLAPPING CHARACTER STRINGS
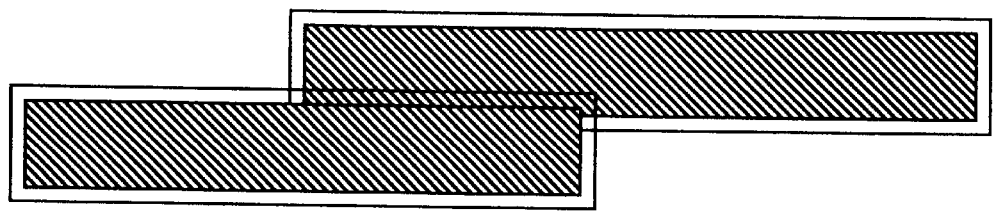
FIG.37A
EXAMPLE OF JUDGEMENT OF
NON - OVERLAPPING CHARACTER STRINGS
K A W A K O H A R A
K A I S U I Y O K U J O
K E N K O H O K E N
C E N T E R
FIG.37B
EXAMPLE OF JUDGEMENT OF
NON - OVERLAPPING CHARACTER STRINGS
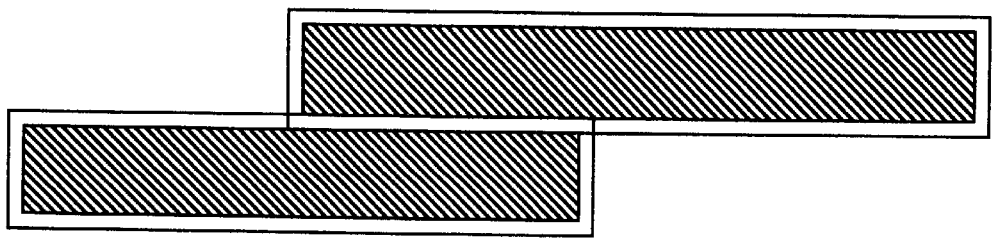

INITIAL STATE

PRESENT POSITION

SELECT CHARACTER STRING HAVING PREDETERMINED ATTRIBUTE

PRESENT POSITION

SELECT CHARACTER STRING NEAR PRESENT POSITION

PRESENT POSITION

INITIAL STATE

PRESENT POSITION

SUBSTITUTION TO SMALL FONTS

PRESENT POSITION

INITIAL STATE

PRESENT POSITION

CALCULATION OF DISTANCE BETWEEN SAME CHARACTER STRINGS

PRESENT POSITION

SELECT CHARACTER STRING NEAR PRESENT POSITION

PRESENT POSITION

PLOTTING OF POLYGON AND LINE HAVING
PATTERNS ACCORDING TO PRIOR ART

PLOTTING OF POLYGON AND
LINE HAVING SPEED-UP PATTERN

PLOTTING OF POLYGON AND
LINE HAVING SPEED-UP PATTERN

FIG.42A EXAMPLE OF ROUTE DISPLAY ACCORDING TO PRIOR ART SYSTEM
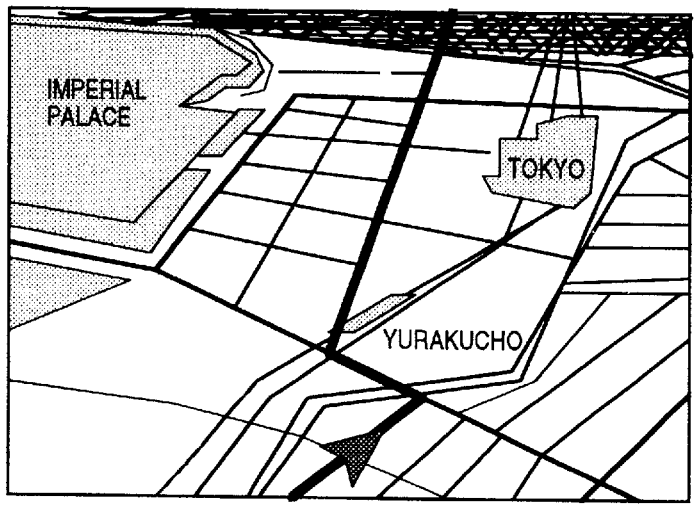
FIG.42B
EXAMPLE OF ROUTE DISPLAY BY PRESENT SYSTEM
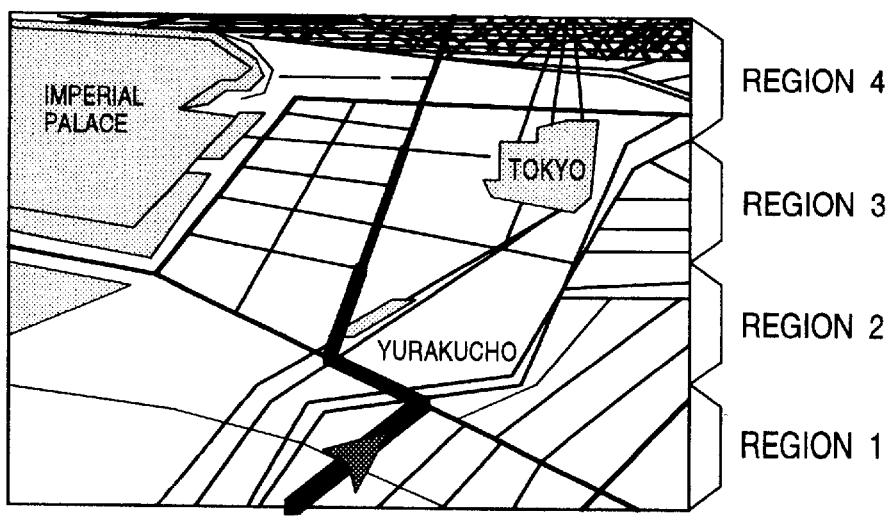

EXAMPLE OF ORBIT DISPLAY ACCORDING TO PRIOR ART SYSTEM

EXAMPLE OF ORBIT DISPLAY BY PRESENT SYSTEM

DISPLAY EXAMPLE OF BIRD'S-EYE VIEW MAP ACCORDING TO PRIOR ART SYSTEM

DISPLAY EXAMPLE OF BIRD'S-EYE VIEW MAP WHEN ARTIFICIAL BACKGROUND IS DISPLAYED

ICON DISPLAY EXAMPLE IN PLAN VIEW MAP

ICON DISPLAY EXAMPLE IN BIRD'S-EYE VIEW MAP

BIRD'S-EYE VIEW MAP WHEN PROJECTION ANGLE IS SET SO AS TO DISPLAY DEEP REGIONS

PRESENT POSITION MARK

BIRD'S-EYE VIEW MAP WHEN PROJECTION ANGLE IS SET SO AS TO DISPLAY FOREGROUND REGIONS

PRESENT POSITION MARK

MAP DISPLAY APPARATUS

CROSS-REFERENCES TO RELATED APPLICATIONS

This application is a continuation of application Ser. No. 09/320,556 filed on May 27, 1999, now U.S. Pat. No. 6,278,383, which is a division of application Ser. No. 08/636,767 filed on Apr. 19, 1996, now U.S. Pat. No. 5,917,436. The contents of application Ser. Nos. 09/320,556 and 08/636,767 are hereby incorporated herein by reference in their entirety.

BACKGROUND OF THE INVENTION

This invention relates to a map display apparatus for use in a navigation system for measuring the position of a mobile body and reporting the present position to a user, and more specifically to a bird's-eye view map display apparatus which provides a map in a more comprehensible way to the user.

A navigation apparatus mounted to a mobile body processes information from a variety of sensors to measure the position of the mobile body and reports the position to a user. This navigation apparatus comprises position measurement means for measuring the absolute position of a mobile body, memory means for storing map data constituted by two-dimensional vector data obtained by projecting points on the ground such as roads and buildings on a plane divided into meshes by universal transverse Mercator projection and character data accompanying the two-dimensional vector data, input means for receiving commands from the user, and display means for reading the necessary vector data from the map mesh stored in the memory means in accordance with the command inputted from the input means and conversion processing the data to display the map on a display. Here, data conversion processing includes movement conversion for changing the display position of the map, reduced scale conversion, such as enlargement and reduction, used for displaying the map in an arbitrary reduced scale and rotation conversion for changing the displaying direction of the map. By means of these processings, a plan view map depicting the ground surface directly overhead by normal projection is displayed on the display.

In navigation apparatuses, according to the prior art, plan view map display which depicts a map by normal projection directly overhead has been employed to display the map. When two points spaced apart from each other are simultaneously displayed, therefore, a reduced scale becomes unavoidably great and detailed information cannot be displayed. One of the means for solving this problem is a bird's-eye view display system which displays a map when points having a certain height from the ground surface are looked down obliquely from afar on a plane. In order to apply this bird's-eye view display to the navigation apparatuses, the following problems must be solved.

First, in the case of the bird's-eye view display which displays a broader range of regions than the plan view map, a reduced scale becomes great at points far rom the start point, so that a greater quantity of information is displayed. According to the prior art systems, character strings of those regions in which the reduced scale becomes great are not displayed or the character strings in the proximity of a view point are merely displayed at the upper part. For this reason, fall-off of characters and overlap of character strings are unavoidable, and recognizability of the characters by the user drops.

Secondly, background data and character data are constituted in the map data base so that display quality attains the highest level when the plan view map is displayed. Therefore, in the bird's-eye view map display displaying a broader range of regions, the frequency of the occurrence that the same character strings are displayed at a plurality of positions becomes higher. Since no counter-measure has been taken in the past for the same character string, the same character string is unnecessarily displayed and this unnecessary character string hides the roads and other background data. In consequence, display quality gets deteriorated.

Thirdly, though a route to the destination is displayed in superposition with the map in a different color from those of the background roads, all the route data are displayed with the same line width in the past because the concept of the road width does not exist in the vector data expressing the routes. However, because the map is expressed three-dimensionally in the bird's-eye view display, the feel of three-dimensional depth will be lost if all the routes are displayed by the same line width.

In the fourth place, in the display of a driving orbit, it has been customary in the prior art to store the position information of driving in a certain distance interval and to display the points representing the driving orbit on the basis of the position information so stored. When the driving orbit is displayed by the method of the prior art system on the bird's-eye view map, however, the gap of the point strings representing the orbit is enlarged in the proximity of the view point at which the reduced scale becomes small, and the user cannot easily recognize which route he has taken. The gap of the dot strings becomes unnecessarily narrow, on the contrary, at portions away from the view point at which the reduced scale becomes great, and the roads and the character strings as the background information are hidden. Therefore, the user cannot easily recognize the map information, either.

In the fifth place, pattern information, e.g. solid lines and dash lines, used for displaying the vector information such as roads, railways, administrative districts, etc., and pattern information, e.g. check and checkered patterns, used for displaying polygons representing water systems, green zones, etc., are registered to the map data base. When the map containing these pattern information is displayed by bird's-eye view, the prior art systems execute not only perspective conversion of each apex coordinates constituting the lines and the polygons but also perspective conversion of the patterns for displaying the map. Therefore, the processing time becomes enormously long, and the time required for bird's-eye map display gets elongated.

In the sixth place, in order to prevent dispersion of the map data displayed near an infinite remote point called a "vanishing point" in the bird's-eye map display, the display region is limited to the foreground region by a predetermined distance from the vanishing point and artificial background information such as a virtual horizon and sky are displayed at the depth in the prior art system. However, these artificial background information in the prior art systems have fixed patterns or fixed colors and do not match the surrounding conditions.

In the seventh place, when the bird's-eye view map display and the plan view map display are switched, the user cannot easily discriminate which of them is actually displayed when the number of objects plotted is small. Moreover, the user can operate and change the position of the view point in the bird's-eye view map display, and the map region actually displayed greatly changes depending on the position of the view point and on the direction of the visual field. In the prior art systems, however, there is no means for providing the information of the position of the view point, etc., even when the position of the view point and the direction of the visual field are changed, and the systems are not easy to handle.

In the eighth place, when the bird's-eye view map is displayed, the map displaying direction is set in such a manner that the image display direction coincides with the driving direction, as described, for example, in JP-A-2-244188. When the destination is set, the driving direction and the direction of the destination are not always coincident, so that the destination disappears from the screen. Accordingly, there remains the problem that the user cannot recognize the map while always confirming the direction of the destination.

In the conventional bird's-eye view map display, in the ninth place, even when a map information density is low in a certain specific direction or when a specific direction comprises only information having specific attributes, the display position of the view point, that is, the display position of the present position, does not change on the screen. In other words, there occurs the case where a large quantity of information, which are not much significant, are displayed on the display region having a limited area, and the information cannot be provided efficiently.

SUMMARY OF THE INVENTION

To solve the first problem, the present invention uses means for judging whether or not overlap occurs between character strings or symbols, and selecting and displaying character strings or symbols having predetermined attributes when overlap exists, or selecting and displaying character strings or symbols in the proximity of the view point, or replacing the overlapping character strings or symbols by a font size smaller than the recommended font size. The character overlap judgement means uses means for judging that the character strings overlap by using rectangular region information circumscribed with the character strings when the mutual circumscribed rectangular regions overlap, or judges that the character strings overlap by using rectangular region information of rectangles positioned more inside by a predetermined distance from the rectangles circumscribed with the character strings when mutual rectangle regions overlap.

To solve the second problem, the present invention uses means for judging whether or not the same character strings or symbols exist inside the screen displaying a certain bird's-eye view map, and selecting and displaying character strings in the proximity of the view point when the same character string or symbol exists. It is effective to display both the character strings or symbols if the mutual distance is great even when the same character strings or symbols exist. Accordingly, the present invention uses means for selecting and displaying character strings in the proximity of the view point when the distance between the same character strings or symbols or the distance between them in the bird's-eye view map display is judged as existing within a predetermined range, and for displaying both of the character strings or the symbols when the distance is judged as existing outside the range.

To solve the third problem, the present invention uses means for displaying routes in the proximity of the view point by thicker lines than routes apart from the view point when the routes are displayed on the bird's-eye view map. Alternatively, the present invention uses means for dividing the bird's-eye view map into a plurality of regions and displaying routes by a line width inherent to each region when the routes to be displayed in superposition in these regions are displayed.

To solve the fourth problem, the present invention uses means for obtaining an orbit which supplements the stored orbit information for the driving routes in the proximity of the view point, and displaying the orbit in superposition with the bird's-eye view map. As to driving orbits away from the view point, on the other hand, the present invention uses means for thinning out the stored orbit information and displaying the orbits so thinned out in superposition on the bird's-eye view map.

To solve the fifth problem, the present invention uses means for executing perspective conversion the lines constituting the map data and each apex coordinates constituting polygons, and displaying the polygons or the lines by using the patterns used for plan view map display by using the coordinates values after perspective conversion.

To solve the sixth problem, the present invention uses means for limiting display of the map in the foreground regions by a predetermined distance from the vanishing point and changing the colors or patterns of the artificial background such as the horizon and the sky to be displayed at the depth. More concretely, the present invention uses means for changing the colors or the patterns of the artificial background information by a blue color representing the sky when lamps are not lit and by a black or grey color when the lamps are lit, by using signals representing the condition of the car, that is, light turn ON/OFF signal of the car.

To solve the seventh problem, the present invention uses means for causing a map display control portion to switch the bird's-eye view map and the plan view map in accordance with a user's request, and causing a menu display portion, which displays a mark in superposition with the map, to receive the change of the display state of the map and to display the mark representing the plan view map in superposition with the map when the map is switched from the bird's-eye view map to the plan view map. When the map is switched from the plan view map to the bird's-eye view map, the mark representing the bird's-eye view map is displayed in superposition with the map. When the user changes the position of the view point during the display of the bird's-eye view map, the shape of the mark representing the present position is changed and is displayed in superposition with the map.

To solve the eighth problem, the present invention promotes the user to set the destination. After setting of the destination is completed, the direction of the view point is brought into conformity with the direction of the destination from the position of the view point, and the position/direction of the view point and the projection angle are calculated so that the map of predetermined regions is displayed by the bird's-eye view map. Even when the present position is updated, the processing described above is always executed repeatedly to bring the position of the view point into conformity with the present position and to display the bird's-eye view map.

To solve the ninth problem, a region inside the bird's-eye view map, which has a low map information density, and a region constituted by information having only specific attributes are retrieved. When these regions are retrieved, the position of the view point is changed so that the region having a low map information density and the region comprising only the information of the specific attributes do not occupy a large area on the display screen. The bird's-eye view map is displayed by using the information of the position of the view point and the projection angle so obtained.

When overlap exists between the character strings in the bird's-eye view map display, the first means displays one of them, or displays the overlapping character strings by changing their size to the smaller fonts.

When the same character strings or symbols exist in the bird's-eye view map display, the second means selects and displays the character strings closer to the view point.

In the bird's-eye view map display, the third means so functions as to display the guiding route near the view point by a greater line width than the guide routes existing away from the view point.

In the bird's-eye view map display, the fourth means so functions as to display the dot strings representing the driving orbit with suitable gaps between the region near the view point and the region far from the view point.

In the bird's-eye view map display, the fifth means so functions as to speed up the display of pattern lines and polygons in which patterns exist.

In the bird's-eye view map display, the sixth means so functions as to display the artificial background in different colors or different patterns in accordance with the condition of the car.

In the bird's-eye view map display, when the bird's-eye view map and the plan view map are mutually switched, the seventh means so functions as to change the shape of the mark to be displayed in superposition with the map in the direction. of the position of the view point and the visual field.

In the bird's-eye view map display, the ninth means so functions as to reduce the occupying area of the regions having a low map information density or comprising only information of specific attributes.

BRIEF DESCRIPTION OF THE DRAWINGS

FIGS. 3A, 3B, 3C and 3D are explanatory views showing a perspective conversion process of a map;

FIG. 14 is a flowchart of character string display in bird's-eye view map display;

FIGS. 16A, 16B, 16C and 16D show an embodiment for character fringing display for representing one character by a plurality of characters;

FIGS. 18A to 18J show an embodiment for display means of a fringed character;

FIGS. 26A, 26B, 27A, 27B, 28A, 28B, 29A and 29B show an embodiment for character string overlap judgement in bird's-eye view map display;

FIGS. 30A, 30B, 31A, 31B, 32A, 32B, 33A and 33B show an embodiment for character string overlap judgement in bird's-eye view map display;

FIGS. 34A, 34B, 35A, 35B, 36A, 36B, 37A and 37B show an embodiment for character string overlap judgement in bird's-eye view map display;

FIGS. 42A and 42B show an embodiment for route display in bird's-eye view map display;

DESCRIPTION OF THE PREFERRED EMBODIMENTS

Figure 1:
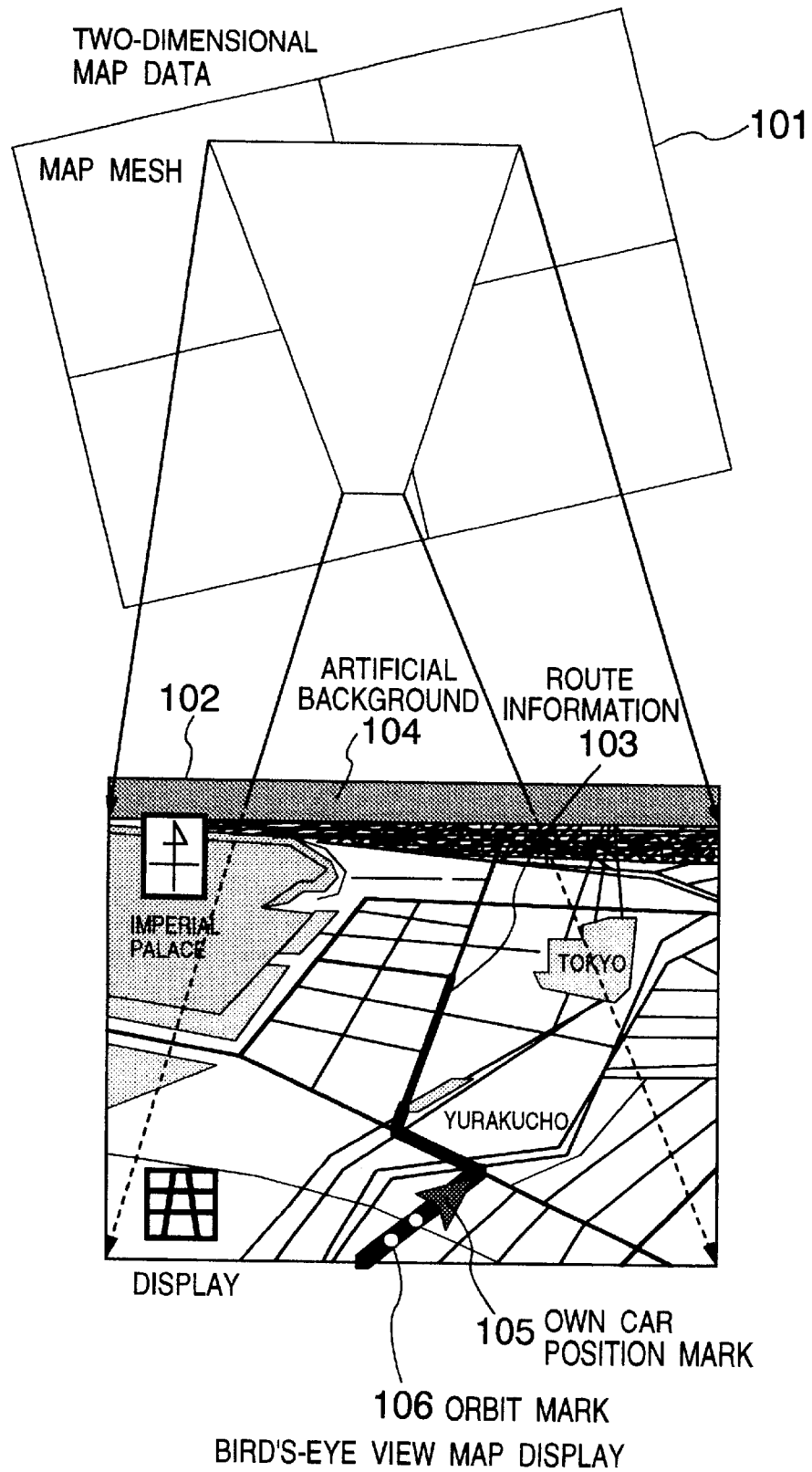
FIG. 1 shows a bird's-eye view map display according to an embodiment of the present invention.

FIG. 1 shows an example of the bird's-eye view map displayed by a bird's-eye view map display device mounted to a navigation system according to an embodiment of the invention. The bird's-eye view map display device according to this embodiment generates a bird's-eye view 102 showing a bird's-eye view from a specific position as a projection chart of two-dimensional map data (indicated by reference numeral 101 in FIG. 1), and displays it on a display screen of a display 2. Incidentally, in the bird's-eye view 102 shown in FIG. 1, a folded line 103 is provided with a thick line and is highlighted in order to represent a guiding route. An artificial background 104 represents the sky, a mark 105 represents the present position and an orbit mark 106 represents the orbit of a car so far driven. Further, arrows in FIG. 1 represent the relationship of projection from the two-dimensional map data 101 to the bird's-eye view 102.

The outline of bird's-eye view map display as the characterizing feature of the present invention will be explained with reference to FIG. 2.

In printed map charts or in the navigation systems according to the prior art, a map is represented by a plan map display obtained when a given area is viewed from an infinitely remote point above this area. Because this plan map display has the advantage that a reduced scale is constant irrespective of points inside the same display screen, the feel of distance is easy to grasp. When an area between certain two points is represented on the same screen, however, the operation for adjusting and optimizing the reduced scale of the map display becomes necessary, and if the distance between these two points is great, only limited information can be displayed because the quantity of information that can be displayed at one time is restricted by the size of the display used and the level of its precision. Bird's-eye view display is employed as means for solving this problem. When this bird's-eye view display is used, the information of those portions which are close to the view point is enlarged while the information of those remote from the view point is reduced, as is obvious from FIG. 2. Therefore, when the area between certain two points is displayed on the same screen, the point for which more detailed information is required is situated close to the view point with the other being remote from the view point, and their mutual positional relationship is represented in an easily comprehensible form by displaying the two points on the same screen. Further, a greater quantity of information can be provided to the user on the information near the view point. This bird's-eye view display can be accomplished by effecting perspective conversion which projects two or three-dimensional map information of a plane A to a plane B describing a certain angle θ with the plane A. Since two-dimensional map data can be used as the map information used, bird's-eye view display is feasible by adding the perspective conversion function to existing navigation systems without adding new map data, but various contrivances must be made when the bird's-eye view display is put into practical use.

Figure 4:
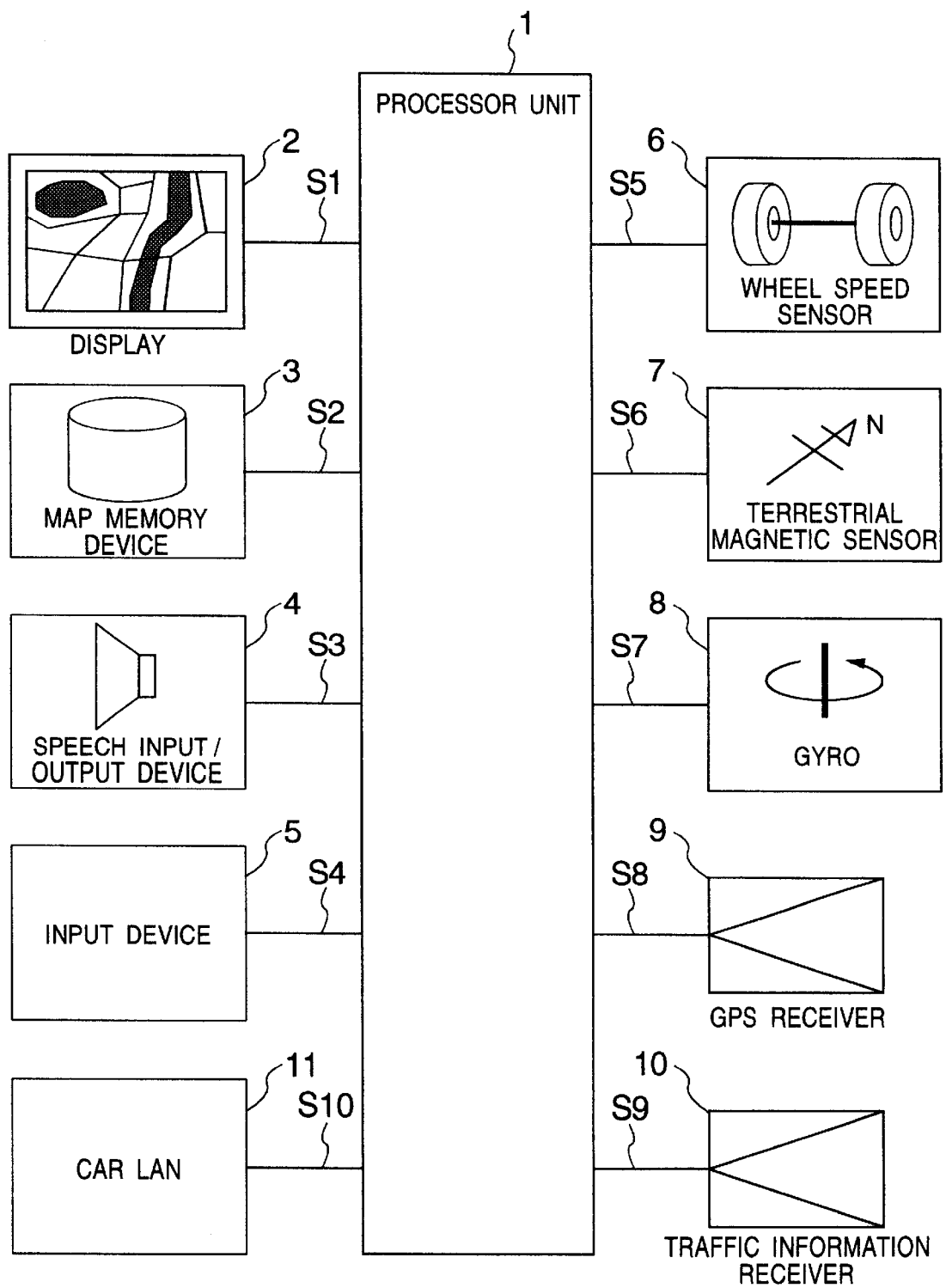
FIG. 4 is a structural view of a navigation apparatus according to an embodiment of the present invention.

FIG. 4 shows a structural example of a navigation apparatus for a mobile body to which the present invention is applied.

Figure 6:
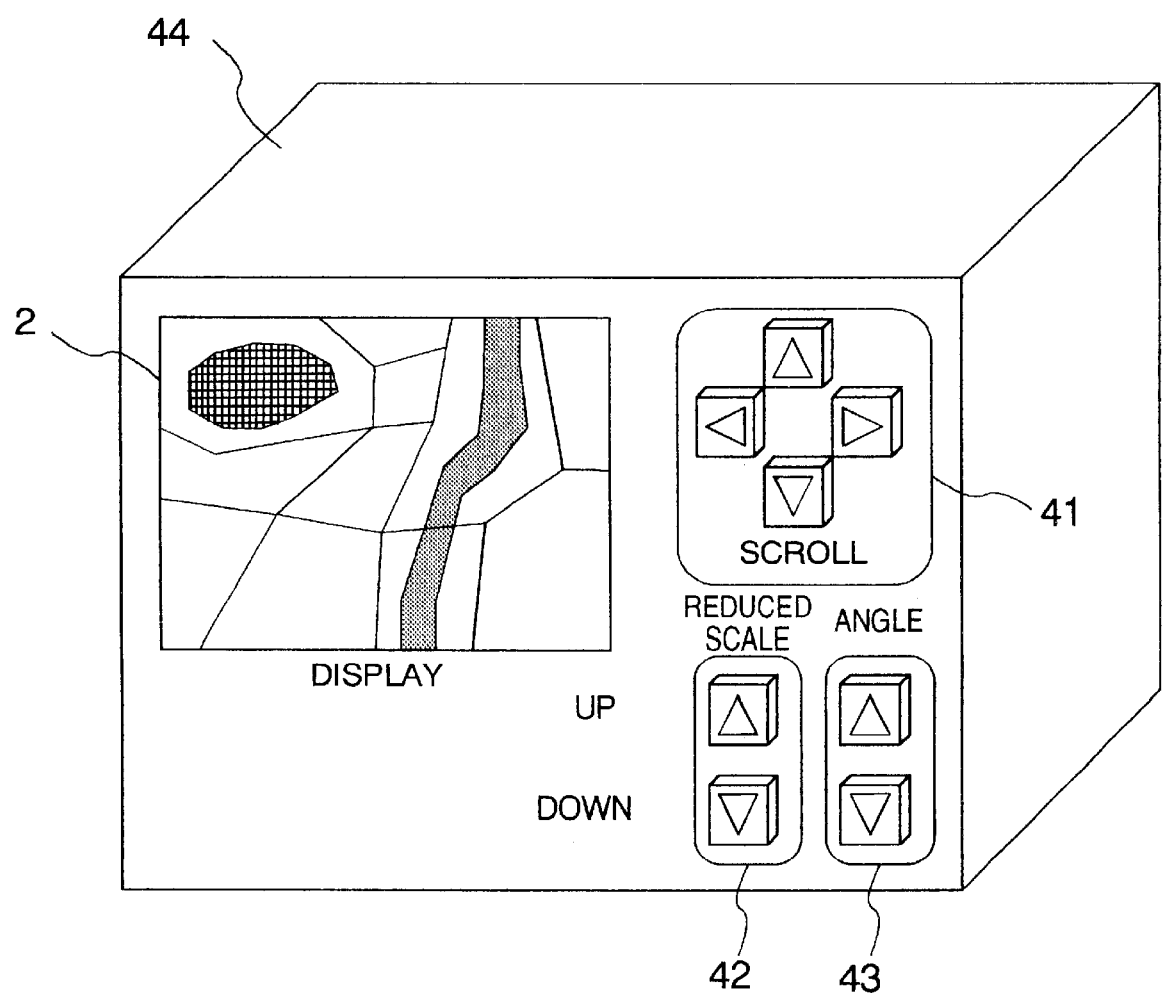
FIG. 6 is an explanatory view showing appearance of a navigation apparatus according to an embodiment of the present invention.

Hereinafter, each structural unit of this navigation apparatus will be explained. A processor unit 1 detects the present position on the basis of the information outputted from various sensors 6 to 9, reads the map information necessary for display from a map memory unit 3 on the basis of the present position information so detected, graphically expands the map data, displays this data on a display 2 by superposing a present position mark, selects an optimum route connecting the destination indicated by the user to the present position and guides the user by using a speech input/output device 4 or the display 2. In other words, it is a central unit for executing various processings. The display 2 is the unit which displays the graphic information generated by the processor unit 1, and comprises a CRT (Cathode-Ray Tube) or a liquid crystal display. A signal S1 between the processor unit 1 and the display 2 is generally constituted by RGB signals or NTSC (National Television System Committee) signals. The map memory device 3 comprises a large capacity memory medium such as a CD-ROM or an IC card and executes read/write processing of the required map data. S2 is a signal between the processor unit 1 and the map memory device 3. The speech input/output device 4 converts the message to the user generated by the processor unit 1 to the speech signals, outputs them, recognizes the user's voice and transfers it to the processor unit 1. S3 is a signal between the processor unit 1 and the speech input/output device 4. An input device 5 is the unit that accepts the user's instruction, and comprises hard switches such as scroll keys 41, reduced scale keys 42 and angle changing keys 43 shown in FIG. 6, for example, a joystick, touch panels bonded on the display 2, or the like. S4 is a signal between the processor unit 1 and the input device 5. The sensors used for detecting the position in the navigation system for a mobile body comprise a wheel speed sensor 6 for measuring the distance from the product of the circumference of a wheel and the number of revolutions of the wheel and measuring a turning angle of the mobile body from the difference of the numbers of revolutions of the wheels forming a pair, a terrestrial magnetic sensor 7 for detecting the magnetic field of the earth and detecting the moving direction of the mobile body, a gyro sensor 8 for detecting the turning angle of the mobile body such as an optical fiber gyro or an oscillation gyro, and a GPS receiver 9 for receiving signals from a GPS satellite, measuring the distance between the mobile body and the GPS satellite and the change ratio of this distance for at least three satellites and thus measuring the present position of the mobile body, its travelling direction and its course. The input device further includes a traffic information receiver 10 for receiving signals from beacon transmitters and FM multiplex broadcasting that transmit weather information and traffic information such as road jamming information, closed-to-traffic information, parking lot information, etc., and outputting received information S9 to the processor unit 1. Furthermore, an internal LAN device 11 is provided so as to receive various information of the car such as door open/close information, the information on the kind and condition of lamps turned ON, the information of the engine condition, the information on the result of trouble-shooting, and so forth, and output car information S10 to the processor unit 1.

Figure 5:
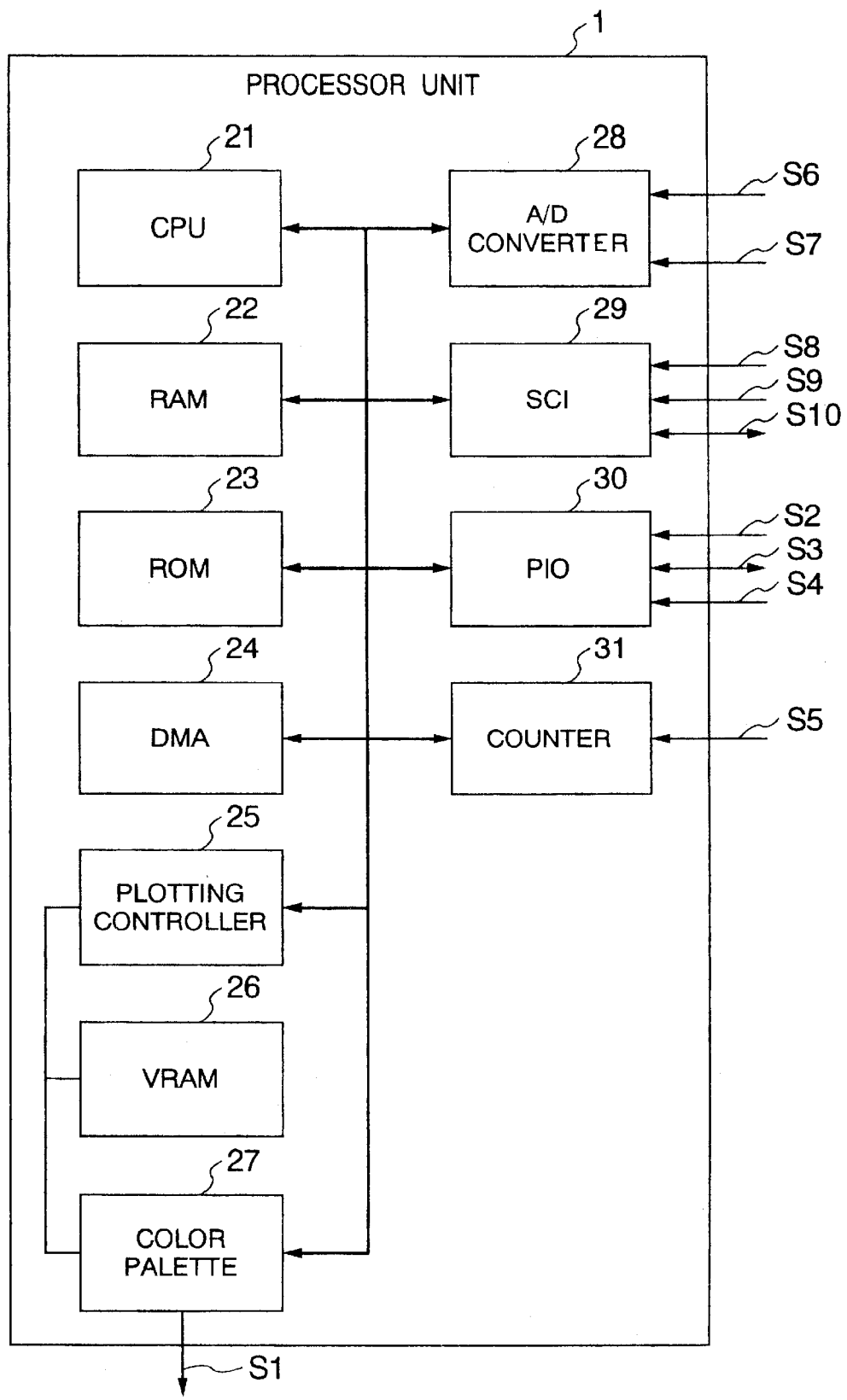
FIG. 5 is a hardware structural view of an arithmetic processing portion of the embodiment of the present invention.

FIG. 5 is an explanatory view showing the hardware construction of the processor unit.

Hereinafter, each constituent element will be explained. The processor unit 1 employs the construction wherein devices are connected by a bus. The devices include a CPU 21 for executing computation of numerical values and controlling each device, a RAM 22 for storing the map and the operation data, a ROM 23 for storing the program and the data, a DMA (Direct Memory Access) 24 for executing data transfer at a high speed between the memory and the memory and between the memory and each device, a plotting controller 25 for executing at a high speed graphic plotting such as expansion of vector data to pixel information, etc., and for executing display control, a VRAM 26 for storing graphic image data, a color palette 27 for converting the image data to the RGB signals, an A/D converter 28 for converting analog signals to digital signals, an SCI 29 for converting serial signals to parallel signals in synchronism with the buss a PIO 30 for establishing synchronism with the parallel signal and putting it on the bus, and a counter 31 for integrating pulse signals.

Figure 7:
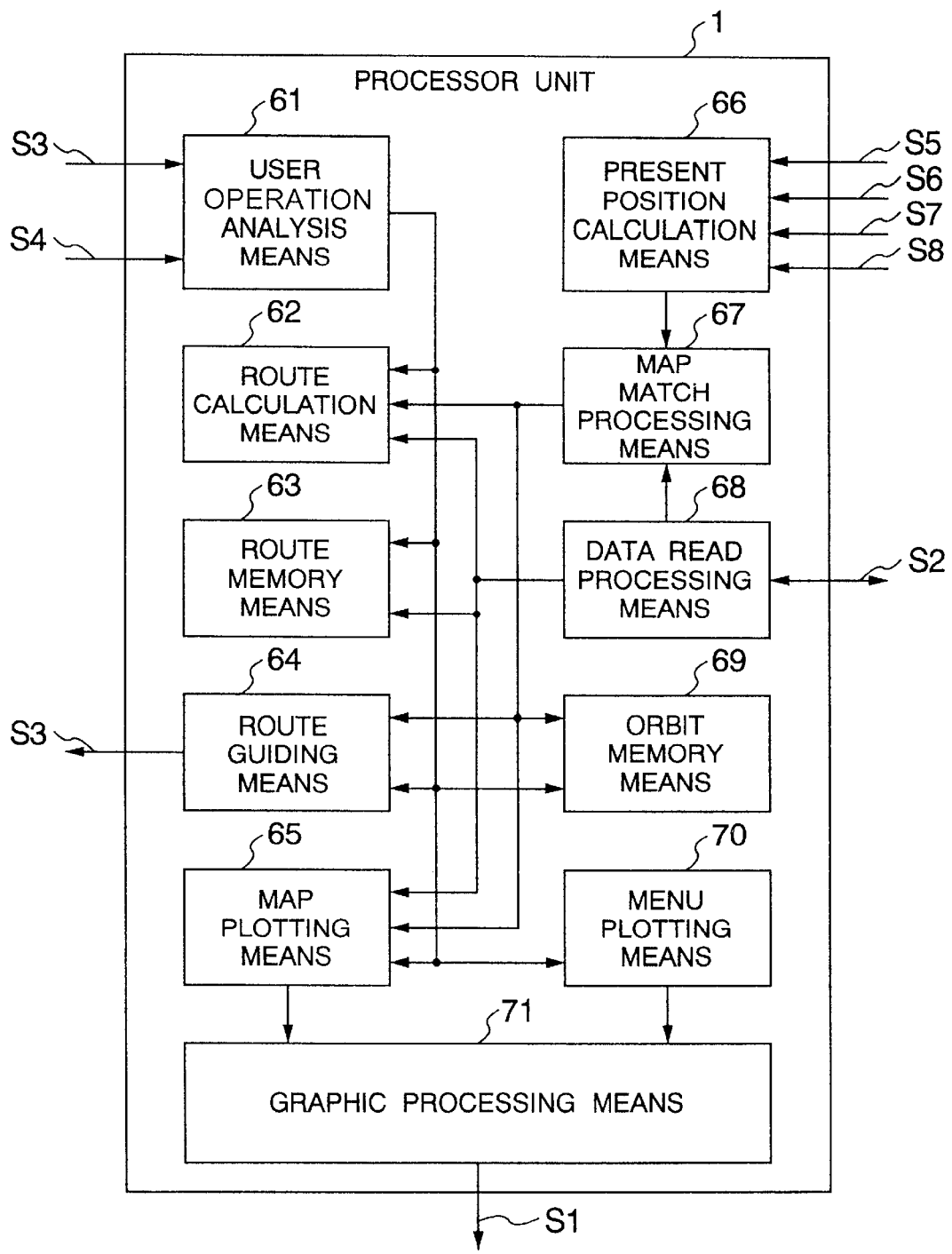
FIG. 7 is a functional structural view of an arithmetic processing portion for accomplishing bird's-eye view map display.

FIG. 7 is a explanatory view useful for explaining the functional construction of the processor unit 1.

Hereinafter, each constituent element will be explained. Present position calculation means 66 integrates on the time axis the distance data and the angle data obtained by integrating the distance pulse data S5 measured by the wheel speed sensor 6 and the angular velocity data S7 measured by the gyro 8, respectively, and calculates the position (X', Y') after driving of the mobile body from the initial position (X, Y). In order to bring the rotating angle of the mobile body into conformity with the azimuth of driving, the azimuth data S6 obtained from the terrestrial magnetic sensor 7 and the angle data obtained by integrating the angular velocity data from the gyro 8 are mapped on the 1:1 basis, and the absolute azimuth of the driving direction of the mobile body is corrected. When the data obtained from the sensors described above are integrated on the time axis, the sensor errors accumulate. Therefore, a processing for canceling the errors so accumulated is executed in a certain time interval on the basis of the position data S8 obtained from the GPS receiver 9, and the present position information is outputted. Since the present position information acquired in this way contains the sensor errors, map-match processing means 67 executes map-match processing so as to further improve positional accuracy. This is the processing which collates the road data contained in the map in the proximity of the present position read by the data read processing means 68 with the driving orbit obtained from the present position calculation means 66, and brings the present position to the road having the highest similarity of shape. When this map-match processing is executed, the present position coincides in most cases with the driving road, and the present position information can be accurately outputted. The present position information calculated in this way is stored in orbit memory means 69 whenever the mobile body drives a predetermined distance. The orbit data is used for plotting an orbit mark on the road on the corresponding map for the road through which the mobile body has run so far.

On the other hand, user operation analysis means 61 accepts the request from the user by the input device 5, analyzes the content of the request and controls each unit so that a processing corresponding to the request can be executed. When the user requests to guide the route to the destination, for example, it requires the map plotting means 65 to execute processing for displaying the map for setting the destination and further requests route calculation means 62 to execute processing for calculating the route from the present position to the destination. The route calculation means 62 retrieves a node connecting between two designated points from the map data by a Dijkstra algorithm, etc., and stores the route so obtained in route memory means 63. At this time, it is possible to determine the route in which the distance between the two points is the shortest, the route through which the destination can be reached within the shortest time or the route through which the driving cost is the lowest. Route guiding means 64 compares the link information of the guide route stored in the route memory means 63 with the present position information obtained by the present position calculation means 66 and the map match processing means 67 and notifies to the user whether or not to drive straight or whether or not to turn right or left before passing by a crossing, etc., by the speech input/output device 4, displays the travelling direction on the map displayed on the display, and teaches the route to the user. Data read processing means 68 so operates as to prepare for reading the map data of the requested region from the map memory device 3. Map plotting means 65 receives the map data around the point for which display is requested from the data read processing means 68 and transfers the command for plotting the designated object in the reduced scale, the plotting direction and the plotting system that are designated, respectively, to graphic plotting means 71. On the other hand, menu plotting means 70 receives a command outputted from the user operation analysis means 61 and transfers a command for plotting various kinds of requested menus and marks to be displayed in overlap with the map to graphic processing means 71. The graphic processing means 71 receives the plotting commands generated by the map plotting means 65 and the menu plotting means 70, and expands the image on the VRAM 26.

Figure 8:
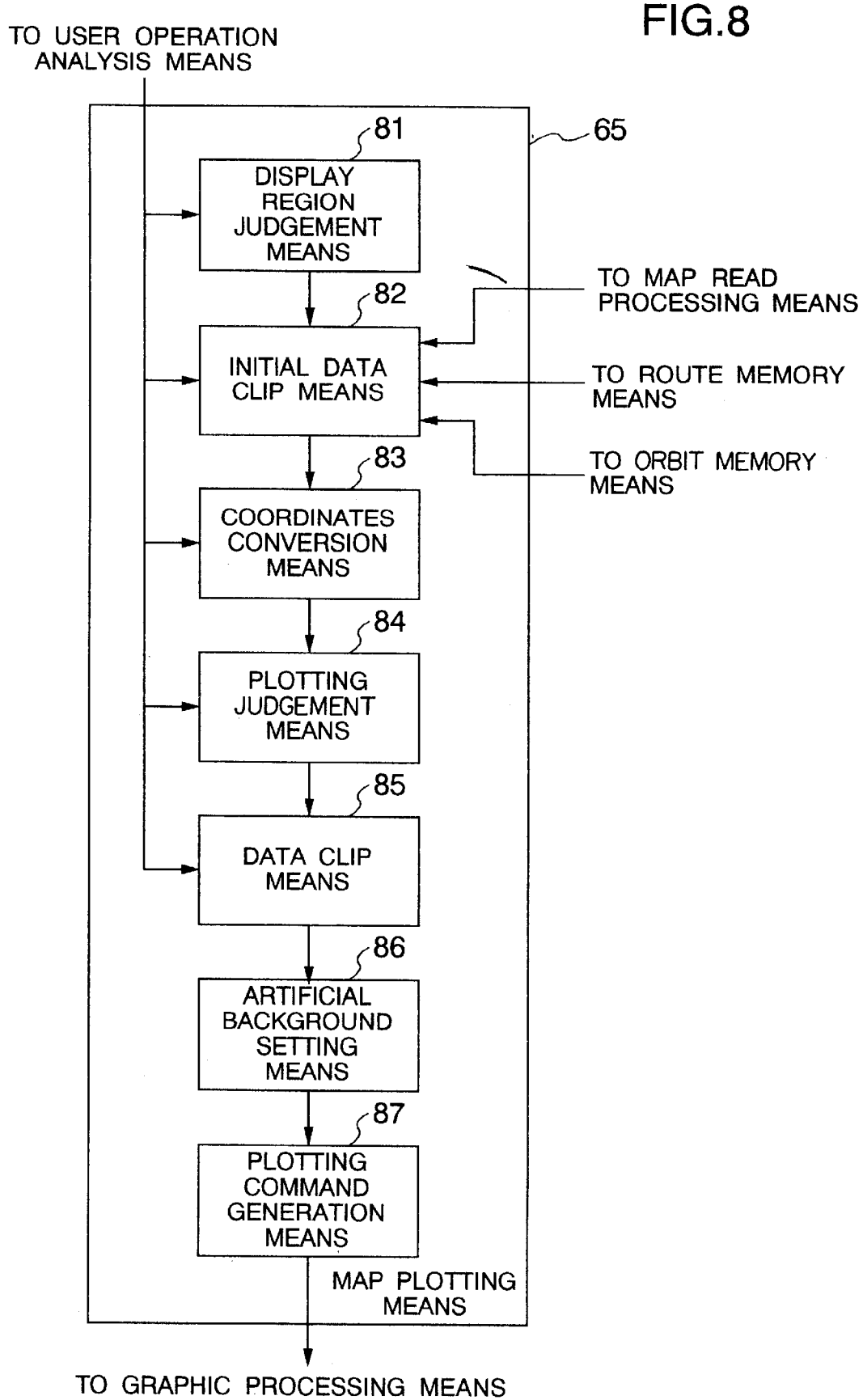
FIG. 8 is a flowchart of map plotting means for accomplishing bird's-eye view map display.

FIG. 8 is an explanatory view useful for explaining the functions of the map plotting means 65.

Hereinafter, each constituent element will be explained. Display region judgement means 81 decides the display reduced scale of the map and decides also which region should be displayed with which point of the map data as the center. Initial data clip means 82 selects, by clip processing, the data necessary for display from the line data, the plan data and the character data representing objects such as roads, buildings, etc., necessary for subsequent processings from each mesh of the map data read out by the data read processing means 68 from the map memory device 3, the line data comprising recommended routes and stored in the route memory means 63 and the point data comprising driving orbits and stored in the orbit memory means 69, on the basis of the information set by the display region judgement means 81. The clip processing algorithms hereby used include a Cohen-Sutherland line clip algorithm for the line and point data and a Sutherland-Hodgman polygon clip algorithm for the plan and character data (Foley et al., *Computer Graphics*, pp. 111–127, Addison-Wesley Publishing Company). This processing can reduce the data quantity which should be subsequently subjected to coordinates conversion and plotting processing and can improve a processing speed.

Coordinates conversion means 83 enlarges or reduces the map data obtained by the clip processing to the target size and when an object must be displayed by rotating it, this means 83 so functions as to effect affine conversion of each coordinates value of the map data. Plotting judgement means 84 so functions as to select those data which are practically necessary for plotting by using the map data obtained by the coordinates conversion means 83. When the reduced scale is great, for example, the data quantity to be plotted substantially increases. Therefore, this means 84 so functions as to omit small roads and the names of places which may be omitted, and to eliminate character strings that are displayed in superposition with one another. Data clip means 85 so functions as to select the map data relating to the plotting area from the map data obtained from the plotting judgement means 84, by clip processing. The clip processing algorithm hereby used may be the same algorithm used by the initial data clip means. Further, this processing may be omitted. Artificial background setting means 86 provides the function which is necessary for bird's-eye view map display and displays the artificial background such as the horizon, the sky, etc., in order to reduce the plotting data quantity and to improve the screen recognition property. Plotting command generation means 87 generates commands for plotting lines, polygons, characters, etc., so as to plot the resulting point, line and plane data as well as the character data by the designated colors and patterns, and the command for setting the colors and the patterns and outputs them to the graphic processing means 71.

Next, the fundamental display system of the bird's-eye view map display will be explained with reference to FIGS. 3A, 3B, 3C, 3D and FIG. 8.

Figure 2:
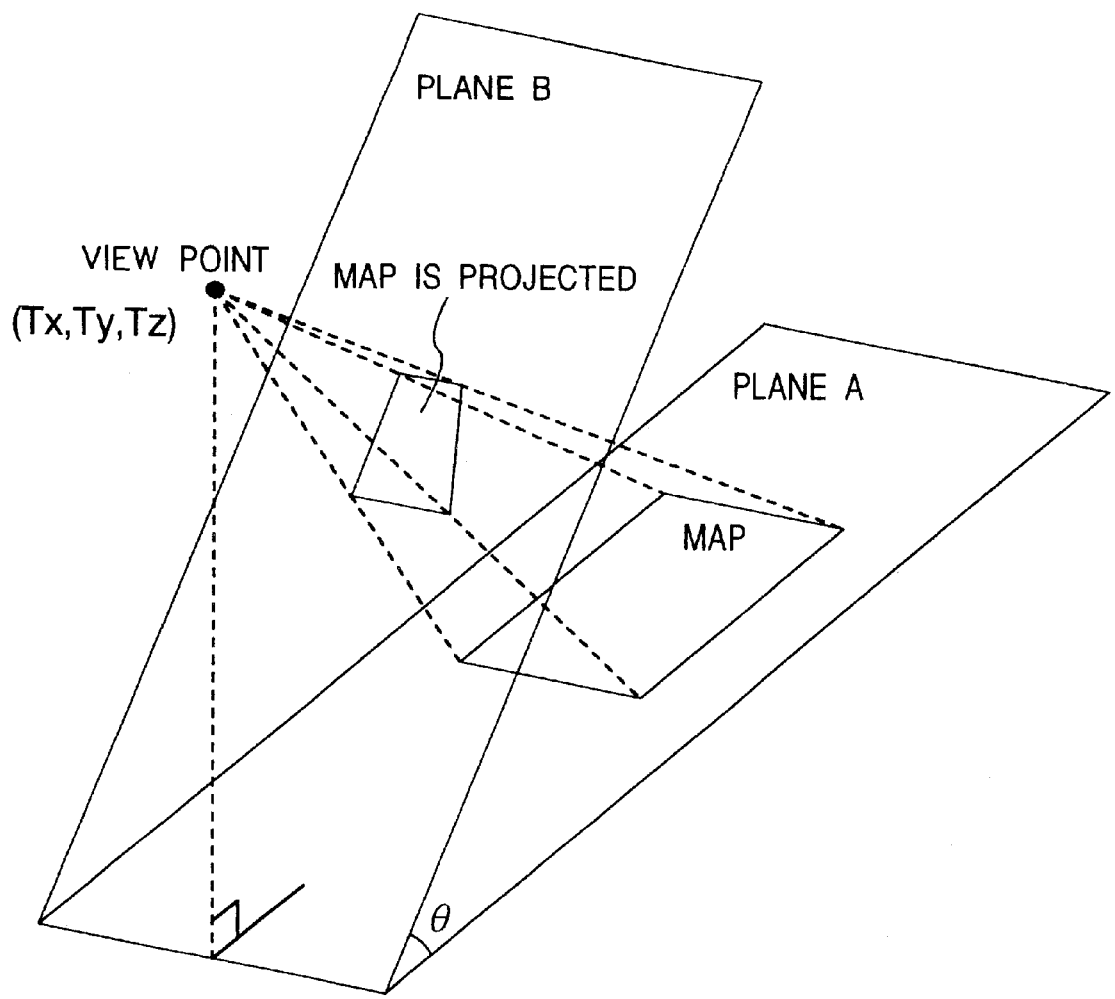
FIG. 2 is an explanatory view showing a perspective conversion processing of a map.

At first, the region for bird's-eye view display is decided by the display region judgement means 81 from the position of the view point and the direction of the visual field and from the angle θ (projection angle) described between the plane A and the plane B in FIG. 2 (step 1 in FIG. 3A). When a bird's-eye view is displayed on a rectangular display, map data of a narrow region is necessary for the area near the view point and map data of a broad region is necessary for the area remote from the view point. Therefore, the map data of a trapezoidal mesh region in the drawings is plotted finally. Next, the necessary map data is extracted by the initial data clip means 82 from the map mesh data inclusive of the region for bird's-eye view display by using the rectangular regions which are circumscribed with the trapezoidal region to be practically plotted (step 2 in FIG. 3B). Next, the coordinates conversion means 83 enlarges or reduces the extracted data and then executes affine conversion so that the trapezoid stands upright. Further, perspective conversion is executed so as to convert each coordinates value of the map data to the data which is represented three-dimensionally (step 3 in FIG. 3C). In this instance, perspective conversion is expressed by the following equations (1) and (2) where the position coordinates of the view point are (Tx, Ty, Tz), the angle between the plane A and the plane B is θ, the map data coordinates values before conversion are (x, y) and the map data coordinates values after conversion are (x', y'):

$$x' = \frac{T_x + x}{T_z + y \cdot \sin\theta} \quad (1)$$

$$y' = \frac{T_y + y \cdot \cos\theta}{T_z + y \cdot \sin\theta} \quad (2)$$

The trapezoid represented at the step 2 in FIG. 3B is subjected to coordinates conversion into the rectangular region represented at the step 3 in FIG. 3C whereas the rectangle circumscribed with the trapezoid represented at the step 2 in FIG. 3B is subjected to coordinates conversion into a deformed rectangle circumscribed with the rectangle represented at the step 3 in FIG. 3C, by perspective conversion, respectively. Because the portions other than the rectangular region need not be plotted, these portions other than the rectangular region are clipped by the data clip means 85 (step 4 in FIG. 3D). The plotting command generation means 87 generates the plotting command by using the map data so obtained, and the graphic processing means 71 conducts plotting to the VRAM 26 so that the bird's-eye view map shown in FIG. 1 can be displayed.

Figure 9:
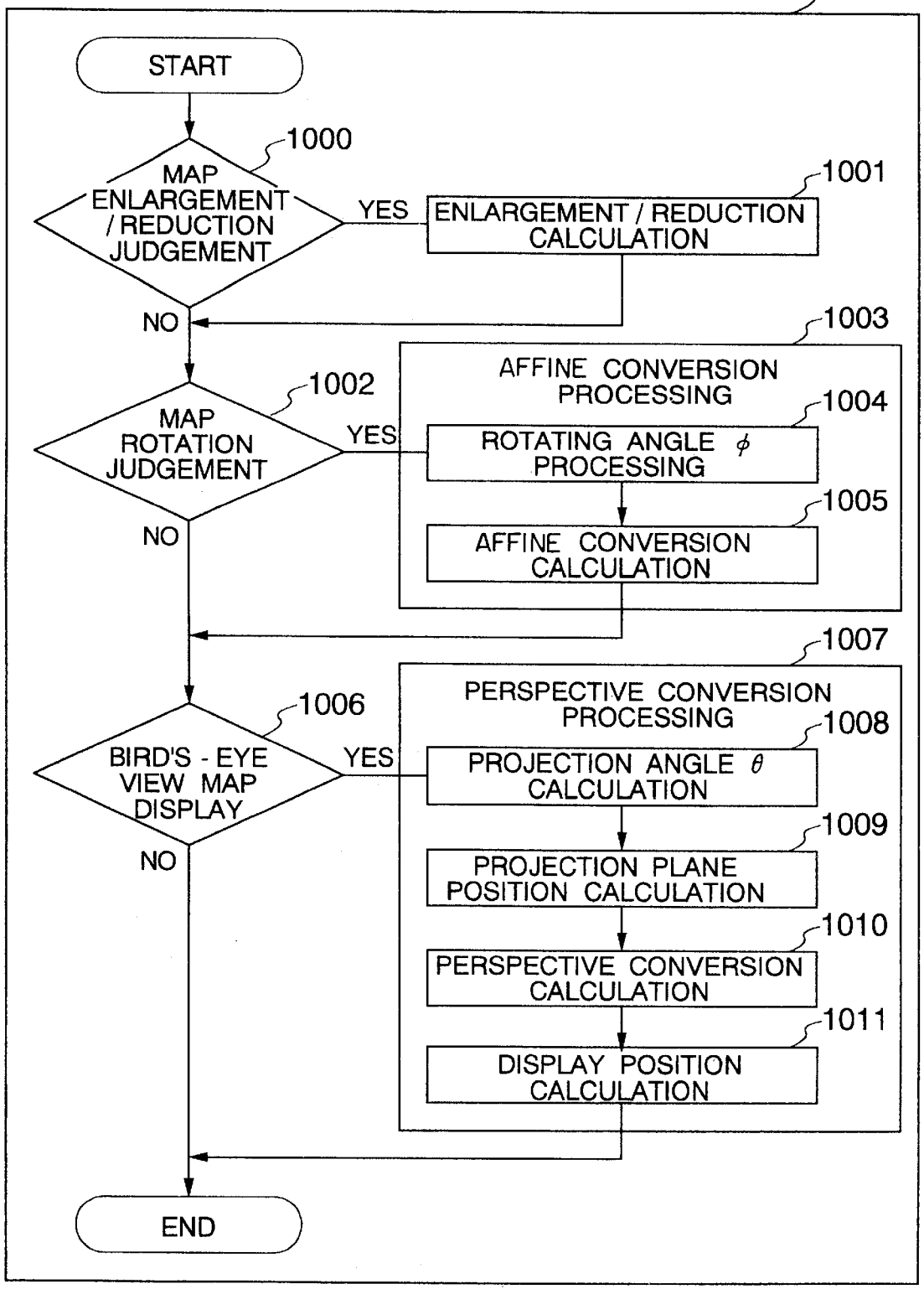
FIG. 9 is a flowchart of coordinates conversion means for accomplishing bird's-eye view map display.
Figure 23A:
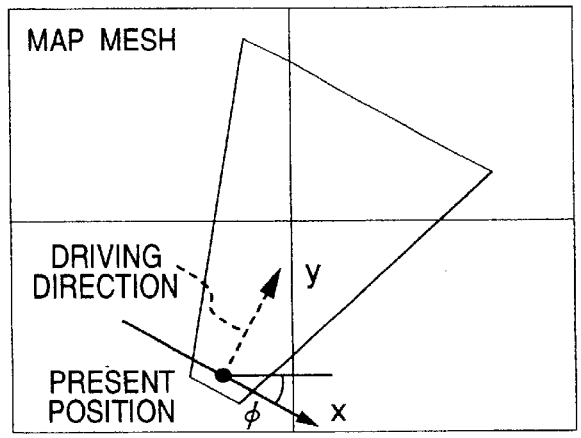
FIGS. 23A, 23B and 23C are explanatory views useful for explaining a setting method of a view point and a projection plane in bird's-eye view map display.
Figure 23B:
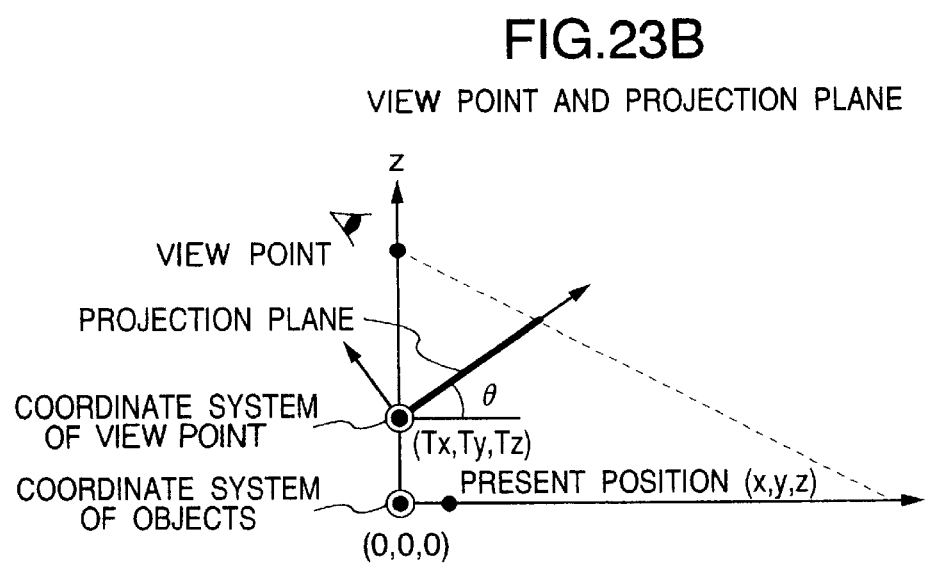
Figure 23C:
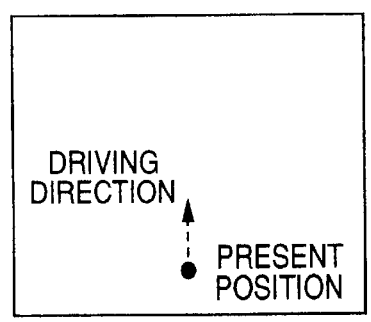

Next, the perspective conversion parameters in bird's-eye view map display, that is, the angle θ between the map and the projection plane (projection angle) and the coordinates (Tx, Ty, Tz) of the origin of the view point coordinates system containing the projection plane, which is viewed from the object coordinates system containing in turn the map plane, or in other words, the method of calculating the position of the projection plane, will be explained with reference to FIGS. 23A, 23B and 23C. It is desired for the navigation apparatus to display in detail the point at which the user is now driving, that is, the region around the present position. Therefore, the explanation will be given on the case where the present position is displayed at the lower center portion of the screen as shown in FIG. 23C. To accomplish bird's-eye view display, it is judged whether rotation of map is necessary at step 1002, and in the event the rotation is considered necessary then the angle φ between the driving direction vector and the base of the map mesh is first determined at the step 1004 in FIG. 9, and affine conversion for rotating the map data to be plotted by the angle φ is executed for each data constituting the map (step 1005). Since bird's-eye view display is judged as being made at the step 1006, the flow proceeds to the processing for calculating the projection angle θ and the position of the view point (steps 1008 and 1009). The projection angle θ is set to an angle near 0° when it is desired to make display so that the difference of the reduced scale becomes small between the portions near the view point and the portions away from the view point, and is set to near 90° when it is desired to make display so that the difference of the reduced scale becomes great between the portions near the view point and the portions away from the view point. Normally, the projection angle θ is set to the range of about 30° to about 45°. Since the user desires to arbitrarily set the map region to be displayed by bird's-eye view map display, the projection angle θ can be set by the projection angle change key 43 provided to the navigation apparatus shown in FIG. 6. When this key 43 is so operated as to increase the projection angle θ, the projection angle θ increases, so that the map of remote regions is displayed. When the key 43 is so operated as to decrease the projection angle θ, the projection angle θ decreases, so that the map near the present position is displayed.

Next, as to the position (Tx, Ty, Tz) of the projection plane, calculation is executed at the step 1009 so that the difference (Δx, Δy, Δz) obtained by subtracting the position (Tx, Ty, Tz) of the position of the projection plane from the present position (x, y, z) is always a constant value. As the absolute values, further, Δx is set to 0, Δz is set to a small value when display is made by a small reduced scale in match with the reduced scale of the map display and to a large reduced scale when display is made by a large reduced scale. Normally, Δz is decided preferably so that the reduced scale of the plane view is coincident with the reduced scale of a certain point near the center of bird's-eye view display. Since the reduced scale of the map is preferably changeable in accordance with the user's request, the step 1009 operates in such a manner as to set Δz to a small value when the user designates a small reduced scale by the reduced scale key 42 provided to the navigation apparatus shown in FIG. 6 and to a large value when a large reduced scale is designated. The Δy value may be either a positive value or a negative value but this embodiment uses the negative value and sets it so that the present position is displayed at a lower ⅓ position of the screen. Step 1010 executes perspective conversion of each coordinates value of the map data by using the projection angle θ and the position (Tx, Ty, Tz) of the projection plane that are obtained in the manner described above.

Figure 10:
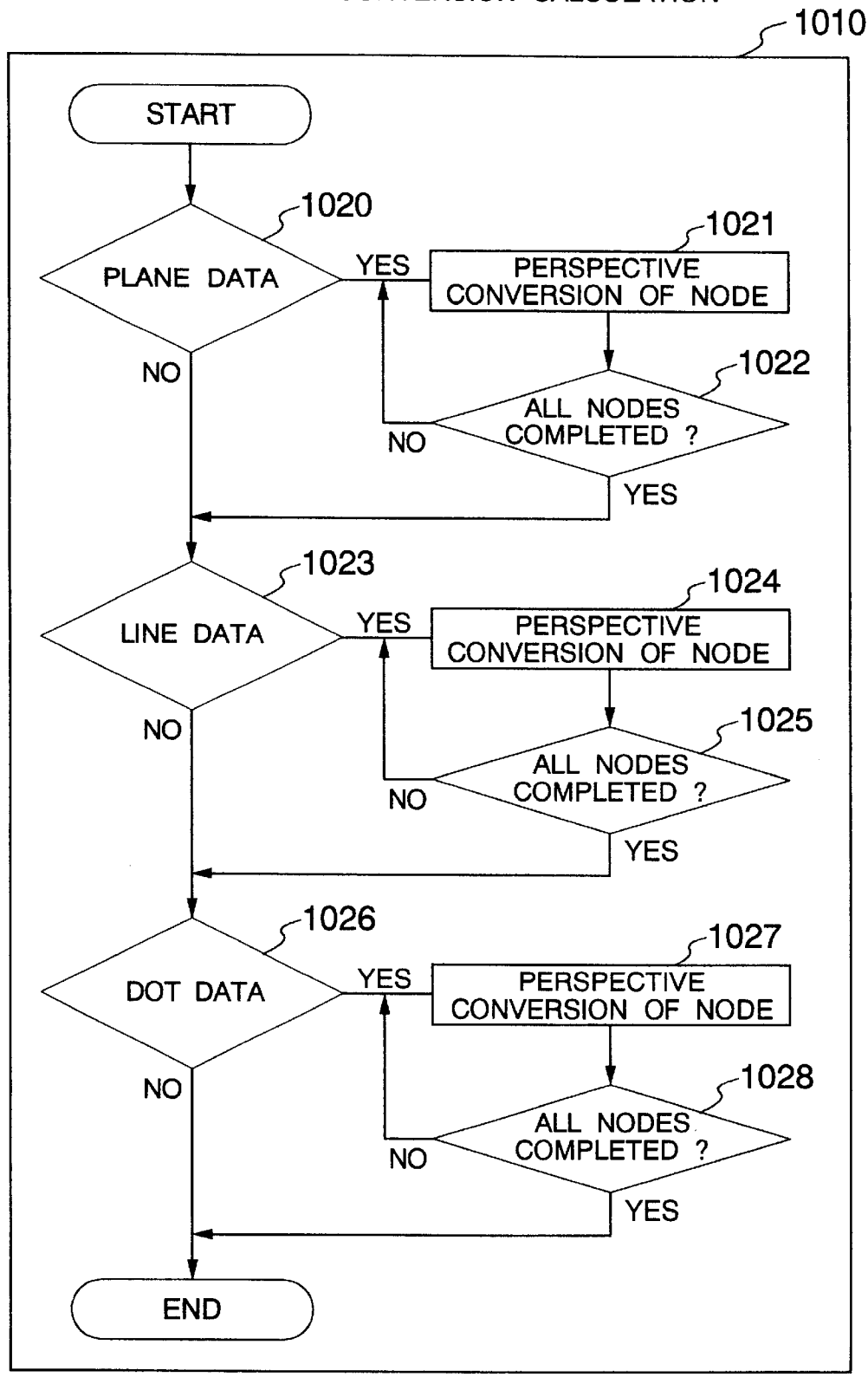
FIG. 10 is a flowchart of perspective conversion computation for accomplishing bird's-eye view map display.

The detail of this perspective conversion operation will be explained with reference to FIG. 10. First, whether or not the plane data constituted by polygons such as water systems, green zones, etc., exist is judged (step 1020). When the result proves YES, perspective conversion is executed for each node constituting the polygon (step 1021). This operation is executed for all the polygons (step 1022). Next, when the line data constituting the map such as the roads, the railways, the administrative districts, etc., and the optimum route from the present position to the destination are calculated, whether or not the line data representing the route exist is judged (step 1023). When the result proves YES, perspective conversion is executed for each node that constitutes the line (step 1024). Further, when the character data constituting the map such as the area names, symbols, etc., and the orbit are displayed, whether or not the point data representing the orbit exist is judged (step 1026). As to the character strings such as the area names, symbols, etc., it is advisable to handle one point representing a given character string such as the upper left end point of the character string as the point data. When these point data are judged as existing, perspective conversion is executed for each node constituting the point (step 1027) and is then executed for all the points (step 1028). The graphic processing means 71 executes plotting processing by using the map data so obtained. In consequence, in bird's-eye view map display shown in FIG. 23C, the driving direction is always displayed in the UP direction on the screen and the present position is always displayed at the same point on the screen.

Figure 24A:
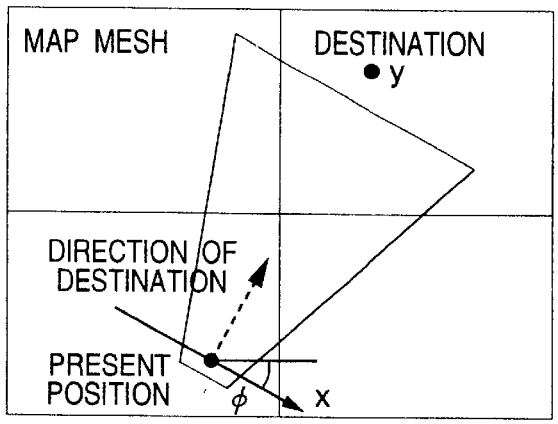
FIGS. 24A, 24B and 24C are explanatory views useful for explaining a setting method of a view point and a projection plane in bird's-eye view map display.
Figure 24B:
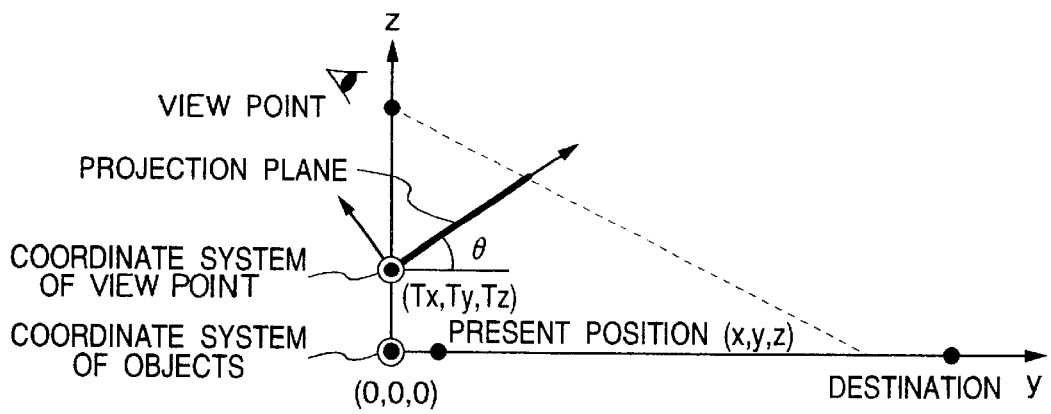
Figure 24C:
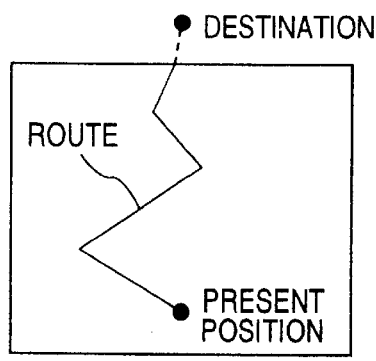

Next, the explanation will be given on the display method of the bird's-eye view map, which can be easily recognized by the driver, when a certain destination is designated by the input device 5 from the map or the retrieved screen, will be explained with reference to FIG. 9 and FIGS. 24A, 24B and 24C. It is desired for the navigation apparatus to display in detail the point at which the user is driving at present, that is, the area near the present position. Therefore, the present position is displayed at the center lower portion of the screen, more concretely at the lower ⅓ region of the transverse center of the screen, as shown in FIG. 24C. To accomplish bird's-eye view display shown in FIG. 24C, the angle φ between the line perpendicular to the line connecting the present position to the destination shown in FIG. 24A and the base of the map mesh is first determined at the step 1004 in FIG. 9 and affine conversion is executed by the angle φ for each coordinates value of the map data to be plotted (step 1005). Since this bird's-eye view display is judged as being made at the step 1006, the flow then proceeds to the processings for calculating the projection angle θ and the position of the view point (steps 1008 and 1009).

The projection angle θ is set to an angle near 0° when it is desired to make display so that the difference of the reduced scale between small between the portions near the view point and the portions away from the view point, and is set to an angle near 90° when it is desired to make display so that the difference of the reduced scale becomes great between the portions near the view point and the portions away from the view point. Normally, the projection angle θ is set to the range of about 30° to about 45°. Since the user desires to arbitrarily set the map region to be displayed by bird's-eye view map display, the projection angle θ can be set by the projection angle change key 43 provided to the navigation apparatus shown in FIG. 6. When this key 43 is so operated as to increase the projection angle θ, the projection angle θ increases, so that the map of remote portions is displayed. When the key 43 is so operated as to decrease the projection angle θ, the projection angle θ decreases, so that the map near the present position is displayed.

Next, as to the position (Tx, Ty, Tz) of the projection plane, calculation is made at the step 1009 so that the difference (Δx, Δy, Δz) obtained by subtracting the position (Tx, Ty, Tz) of the projection plane from the present position (x, y, z) becomes always a constant value. As the absolute values, Δx is set to 0, and Δz is set to a small value when display is made by a small reduced scale in match with the reduced scale of the map displayed, and to a great value when display is made by a large reduced scale. Normally, Δz is preferably set so that the reduced scale of the plan view is coincident with the reduced scale of a certain point near the center of bird's-eye view display. Since the user desires to change the reduced scale of the map, the step 1009 so operates as to set a small value to Δz when the user designates a small reduced scale by the reduced scale key 42 provided to the navigation apparatus shown in FIG. 6 and to set a large value to Δz when the user designates a large reduced scale. The Δy value may be either a positive value or a negative value, but this embodiment uses the negative value and determines the value so that the present position can be displayed at the lower ⅓ position of the screen. The step 1010 executes perspective conversion of each coordinates value of the map data by using the projection angle θ and the position (Tx, Ty, Tz) of the projection plane so obtained, and the graphic processing means 71 executes the plotting processing by using the resulting map data. Consequently, in bird's-eye view display shown in FIG. 24C, the destination is always displayed in the UP direction and the present position is always displayed at the same position on the screen. The navigation apparatus becomes easier to operate by switching the operation mode to the mode in which the destination and the present position are fixed always at certain two points on the screen when the car moves to the position where the destination can be displayed on the screen.

Figure 11:
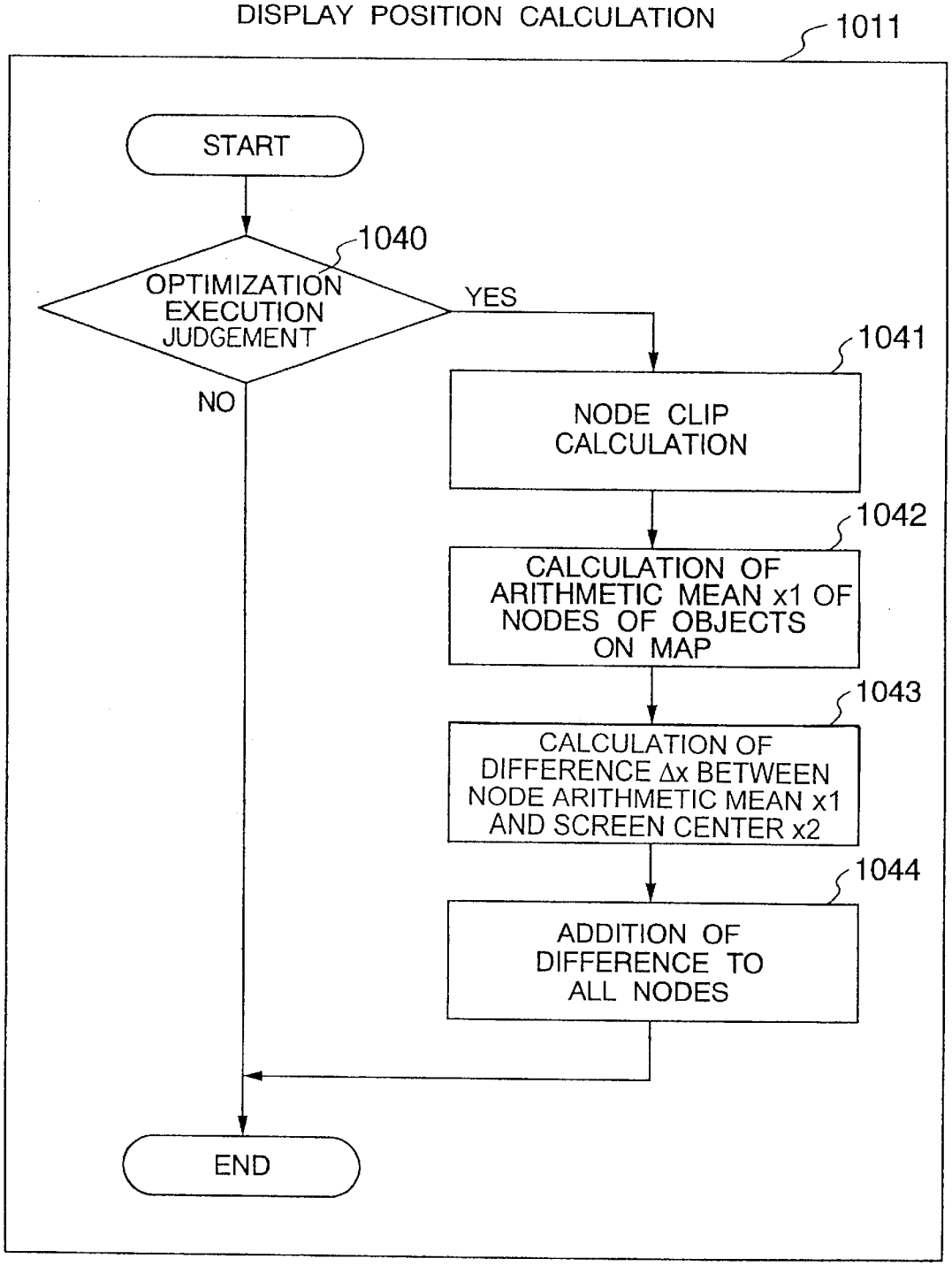
FIG. 11 is a flowchart of display position computation for accomplishing bird's-eye view map display.
Figure 25A:
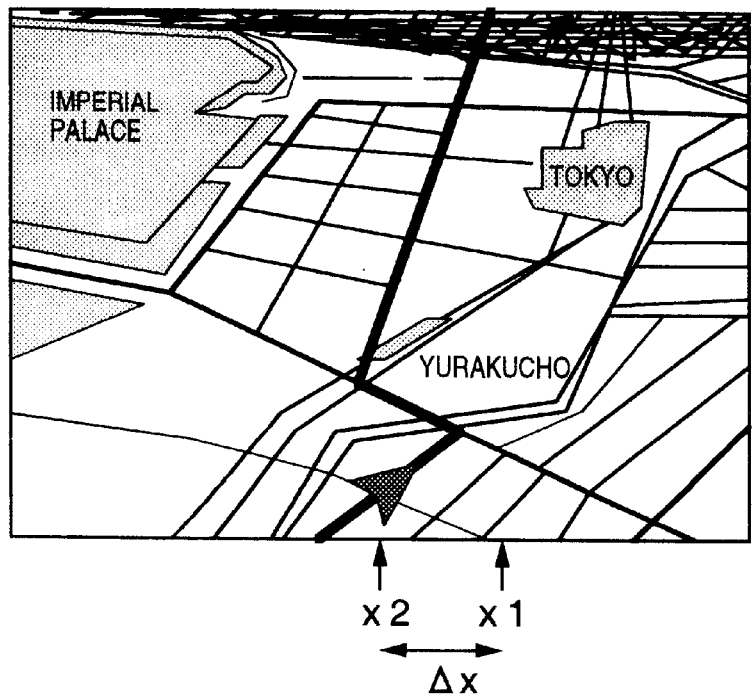
FIGS. 25A and 25B show an embodiment for optimization display of the present position in bird's-eye view map display.
Figure 25B:
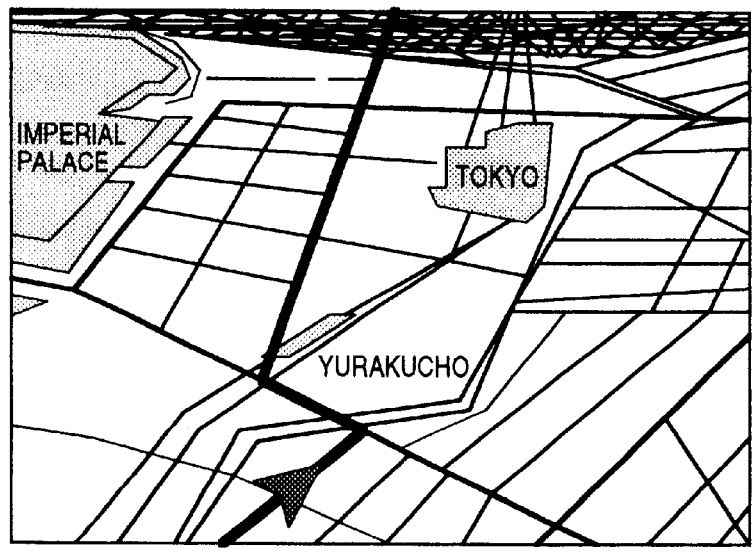
Figure 26A:
Figure 26B:
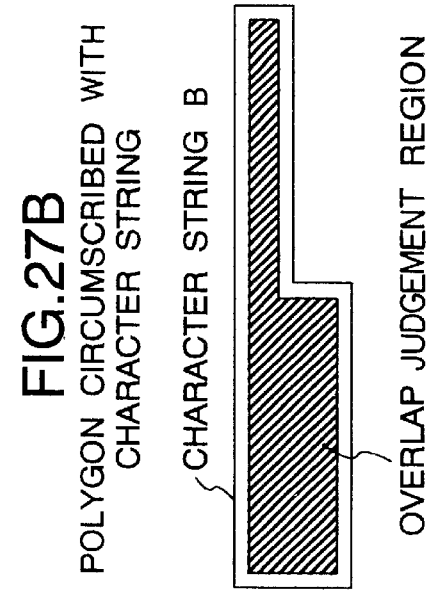
Figure 27A:
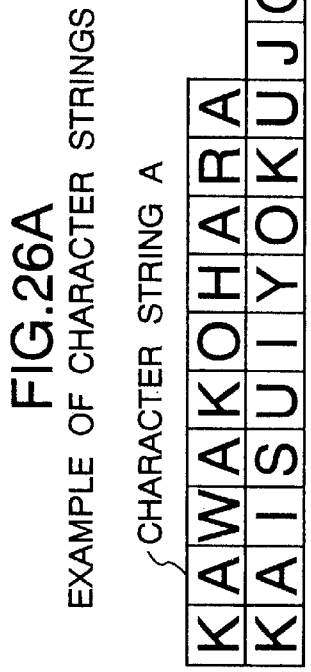
Figure 27B:
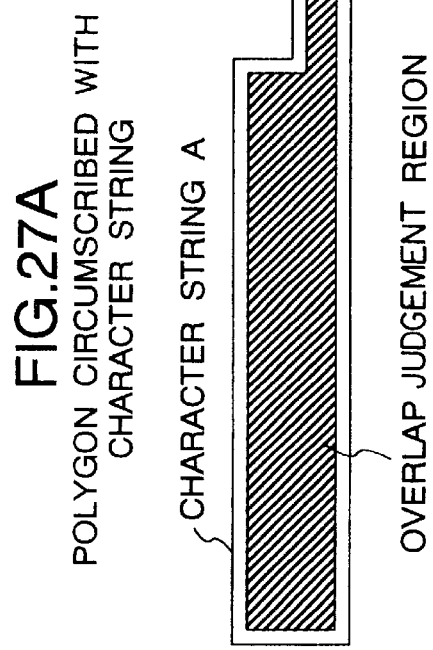
Figure 30A:
Figure 30B:
Figure 31A:
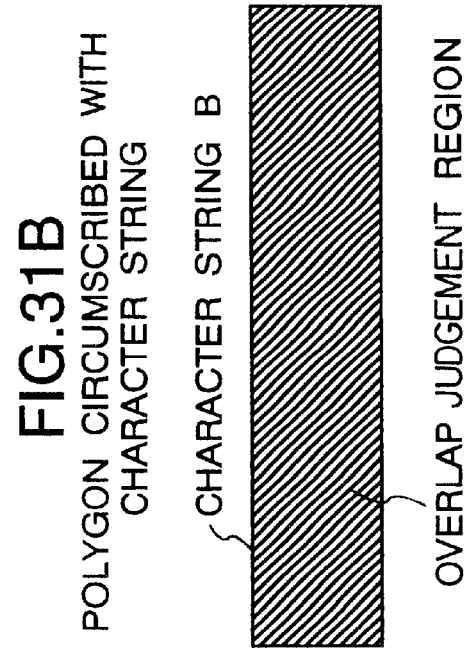
Figure 31B:
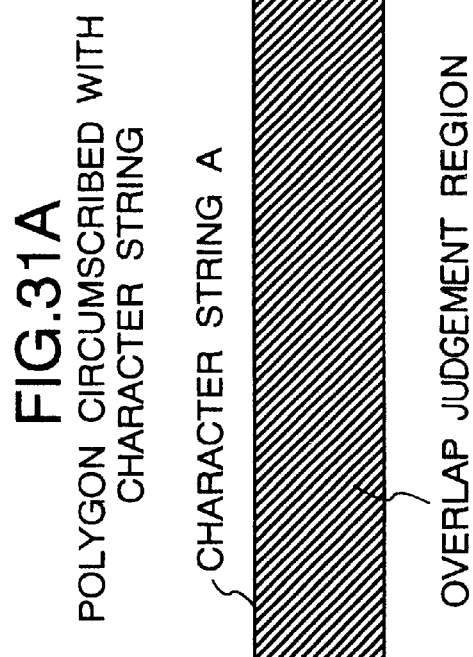
Figure 34B:
Figure 35B:
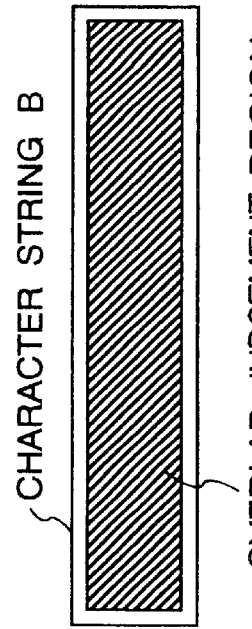
Figure 34A:
Figure 35A:
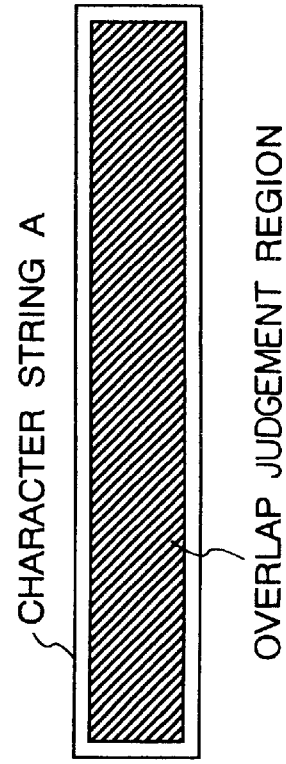

Incidentally, the polygon representing the Imperial Palace, the green zones and the water systems such as sea and lakes are not much useful as the information for the driver driving the car having the navigation apparatus, as shown in FIG. 25A. Rather, a greater quantity of information which is directly necessary for driving, such as the road information, are displayed preferably on the limited screen. Means for solving this problem will be explained with reference to FIG. 11. The information of the roads and the background are represented by the nodes, and the node density of the polygons representing the green zones and the water systems such as sea and lakes tends to be lower than the node density of the lines such as the roads. Therefore, the greatest quantity of information of the roads, etc., are displayed by optimizing the display region in the transverse direction of the screen, for the region displayed in the longitudinal direction, in accordance with the initial value. This processing is executed by the display position Calculation routine at the step 1011 in FIG. 9. First, whether the mode is for executing optimization of the display position is judged (step 1040). When optimization is judged as to be executed, the nodes that are practically displayed on the screen are extracted from the nodes constituting the lines and the polygons subjected to perspective conversion at the step 1041 by clip calculation (step 1041). Further, the difference Δx between the x coordinates arithmetic mean value x1 obtained at the step 1042 and the x-coordinates value x2 at the center of the screen is calculated (step 1043). At the next step 1044, the difference Δx obtained by the step 1043 is added to the x-coordinates value of the nodes constituting the line and the polygon. The graphic processing means 71 executes the plotting processing by using the map data obtained in this manner. In consequence, bird's-eye view map display capable of displaying a greater quantity of those information which are directly necessary for driving, such as the roads, can be displayed on the screen as shown in FIG. 25B.

Figure 12:
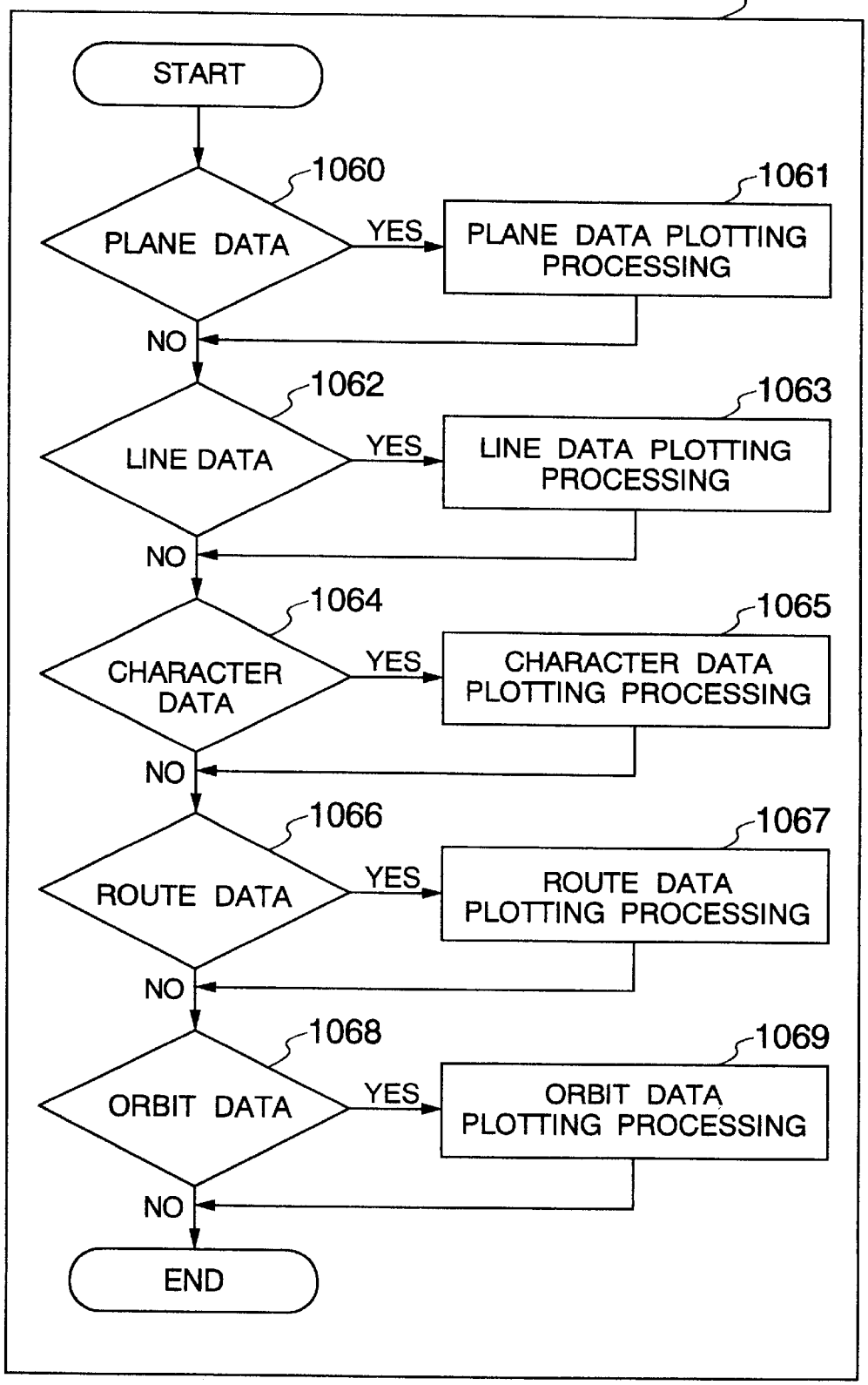
FIG. 12 is a flowchart of plotting judgement means for accomplishing bird's-eye view map display.

Next, the method of the plotting processing of the objects constituting the bird's-eye view map will be explained more concretely. The plotting judgement means 84 shown in FIG. 12 operates in such a manner as to optimally display the plan data, the line data and the character data constituting the map, the route data calculated in accordance with the request from the user and the orbit data representing the route so far driven, respectively.

Figure 13A:
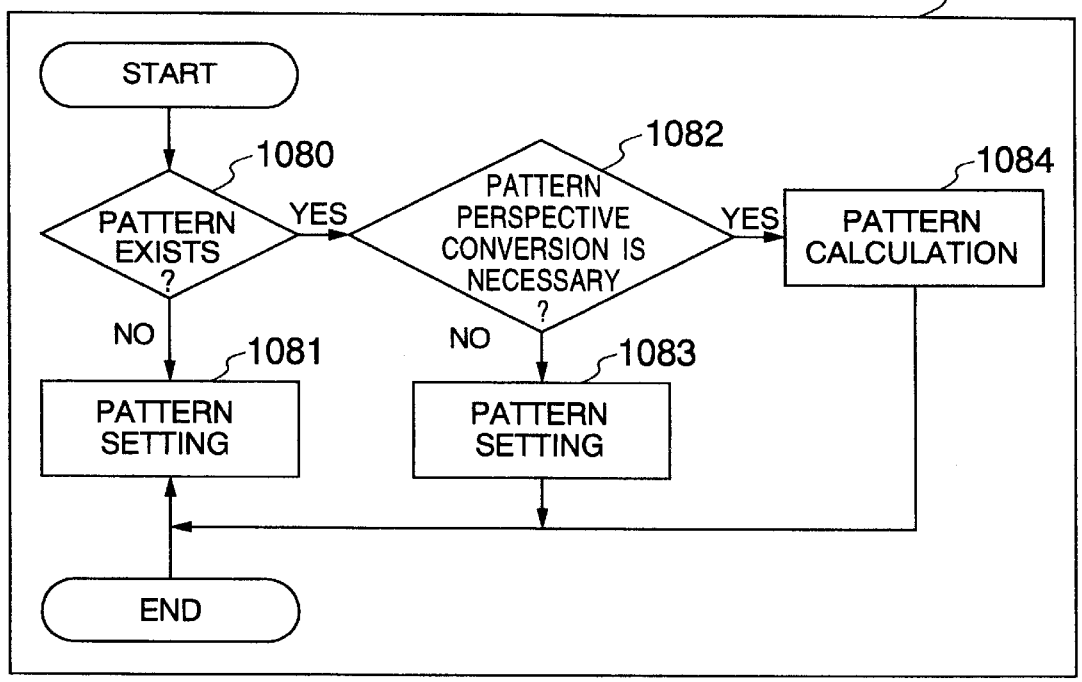
FIGS. 13A and 13B are flowcharts of polygonal and linear pattern displays in bird's-eye view map display.
Figure 41A:
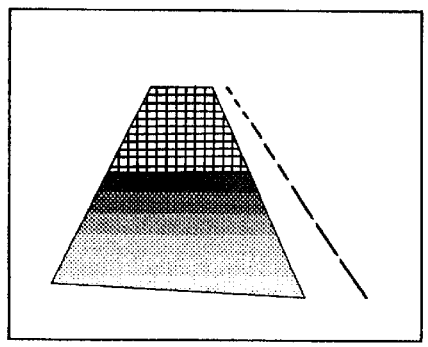
FIGS. 41A, 41B and 41C show an embodiment for polygonal and linear pattern display in bird's-eye view map display.
Figure 41B:
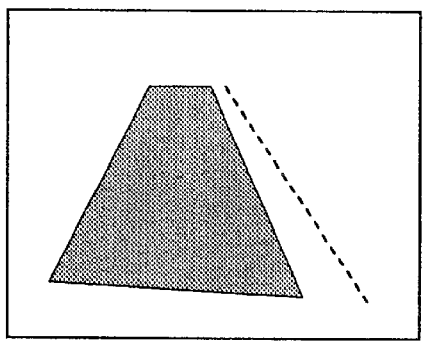
Figure 41C:
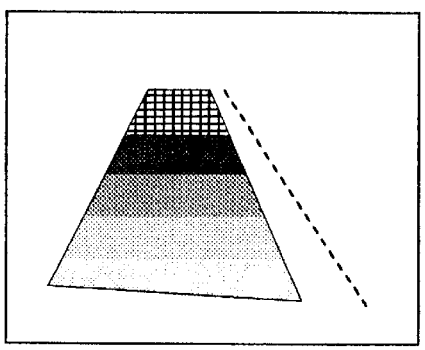

First, whether or not the plane data exists in the plotting data is judged (step 1060). When the plane data is judged as existing, the flow proceeds to the plane data plotting processing (step 1061) shown in FIG. 13A. The plane data plotting processing judges whether the plane pattern exists inside the polygon to be practically plotted or whether the full plane should be smeared away (step 1080). When the plane pattern is not judged as existing, pattern setting is so effected as to smear away the entire portion inside the polygon and the processing is completed (step 1081). When the plane pattern is judged as existing, whether or not perspective conversion is to be executed for the plane pattern is judged (step 1082). When the plane pattern is subjected to perspective conversion and is displayed, the pattern has the feel of depth as depicted in FIG. 41A and can be therefore displayed more three-dimensionally. However, the plotting time gets elongated because the processing quantity becomes greater. When the plane pattern used for plan view map display is displayed, on the other hand, the display becomes planar as depicted in FIG. 41B, but the processing can be made at a higher speed because the plane pattern can be handled two-dimensionally. Therefore, when a higher processing speed is required, perspective conversion of the pattern is judged as unnecessary at the step 1082 and the designated pattern itself is set as the pattern data (step 1083). When display quality has higher priority, on the other hand, perspective conversion of the pattern is judged as necessary at the step 1082. Therefore, the pattern is subjected to perspective conversion and the conversion result is set as the pattern data (step 1084). The method shown in FIG. 41C may be employed as means for improving this processing speed. This method divides a polygon into a plurality of regions (four regions shown in the drawing) in the direction of depth and smearing away each region by using the mean pattern obtained by subjecting the plane pattern to perspective conversion in each of the region. Since the pattern becomes a two-dimensional pattern inside the region according to this method, the processing speed can be improved.

Figure 13B:
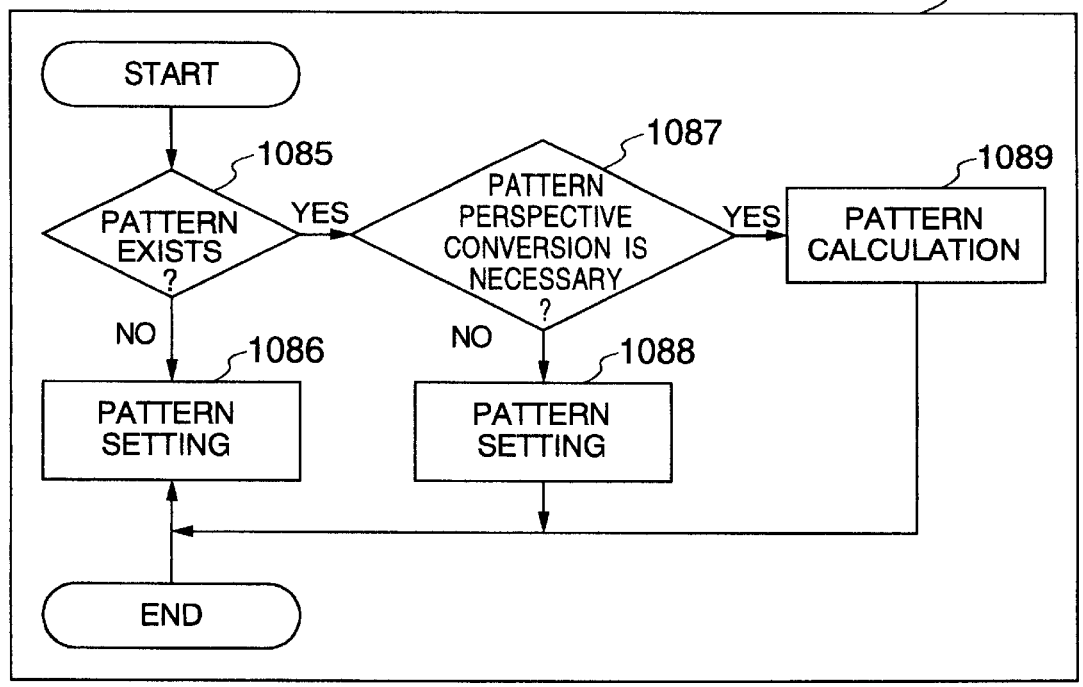

Next, whether or not the line data exists in the plotting data is judged (step 1062). When the line data is judged as existing, the processing shifts to the line data plotting processing (step 1063) in FIG. 13B. In this line data plotting processing, whether the line pattern exists in the lines practically plotted or is smeared by solid lines is judged (step 1085). When the line pattern is not judged as existing, pattern setting is effected so as to draw the solid lines and the processing is completed (step 1087). When the line pattern is judged as existing, whether or not perspective conversion is to be effected for the line pattern is judged as step 1087). When the line pattern is subjected to perspective conversion and is displayed, the feel of depth develops as shown in FIG. 41A and representation can be made more three-dimensionally. However, the plotting time gets elongated in this case because the processing quantity increases. When display is made by the line pattern used for plan view map display, display becomes planar as shown in FIG. 41B, but high speed processing can be made because the line pattern can be handled one-dimensionally. Therefore, when a higher processing speed is required, perspective conversion of the pattern is not judged as necessary at the step 1087 and the designated pattern itself is set as the pattern data (step 1088). On the other hand, when higher priority is put to display quality, perspective conversion of the pattern is judged as necessary at the step 1087. Therefore, the pattern is subjected to perspective conversion and the converted result is set as the pattern data (step 1089).

Next, whether or not the character data exists in the plotting data is judged (step 1064). When the character data is judged as existing, the processing proceeds to the character data plotting processing (step 1065) in FIG. 14. The character data plotting processing judges which attribute each character string in the map has, the attribute being one of a plurality of attributes such as names of places, names of buildings, map symbols, etc. (step 1100), selects character strings having predetermined attributes that must be displayed essentially, and hands over the processing to the step 1101. Since the character string having the attributes that must be essentially displayed is selected, buffering is made so as to display this character string at the step 1101. Next, overlap of one character string with another is judged (step 1102). There are a plurality of methods for judging overlap of the character strings.

The first method will be explained with reference to FIGS. 26A, 26B, 27A, 27B, 28A, 28B, 29A and 29B. This method calculates the polygon encompassing the character string (the outer frame of the polygon shown in FIGS. 26A and 26B) and judges the overlap of the characters by using the polygonal region information (the hatched pattern region of the polygon shown in FIGS. 27A and 27B) constituted by a region positioned inward by a predetermined number of bits from the polygon. According to this method, the character strings are judged as overlapping when the overlap judgement regions (the hatched pattern regions of the polygons) overlap with one another as shown in FIGS. 28A and 28B. When the character overlap judgement regions do not overlap as shown in FIGS. 29A and 29B, the character strings are not judged as overlapping. Generally, the respective character strings can be discriminated even when the characters overlap to some extent, and this system operates in such a manner that overlap of the character strings to some extent are not judged as overlapping. Accordingly, the overlapping character strings are not omitted more than necessary, and the quantity of information to be transmitted to the driver increases.

Next, the second method will be explained with reference to FIGS. 30A, 30B, 31A, 31B, 32A, 32B, 33A and 33B. This method calculates the rectangular regions circumscribed with the character string (the rectangles shown in FIGS. 30A and 30B) and judges overlap of the character strings by using the rectangular region information (the hatched rectangular regions shown in FIGS. 31A and 31B). According to this method, when the overlap judgement regions of the character strings (the hatched rectangular regions) overlap with one another as shown in FIGS. 32A and 32B, the character strings are judged as overlapping. When the character overlap judgement regions do not overlap with one another as shown in FIGS. 33A and 33B, the character strings are not judged as overlapping. Since this method can judge overlap of a plurality of character strings by a simple shape of the rectangle, the minimum and maximum values of the rectangle in the x- and y-axis directions may be merely compared between the overlapping character strings, and the operation time can be therefore shortened.

Finally, the third method will be explained with reference to FIGS. 34A, 34B, 35A, 35B, 36A, 36B, 37A and 37B. This method calculates the rectangular region circumscribed with the character string (the rectangle of the outer frame shown in FIGS. 34A and 34B) and judges overlap of the character strings by using the rectangular region information (the hatched rectangular pattern region shown in FIGS. 35A and 35B) constituted by a region positioned inward by a predetermined number of dots from the rectangle. According to this method, the character strings are judged as overlapping when the overlap judgement regions of the character strings (the hatched rectangular pattern regions) overlap with one another as shown in FIGS. 36A and 36B. The character strings are not judged as overlapping when the overlap judgement regions do not overlap with one another as shown in FIGS. 37A and 37B. Generally, the respective character strings can be discriminated even when overlap of characters occurs to some extent, and this system operates in such a manner that the character strings are not judged as overlapping even when they overlap to some extent. Therefore, the overlapping character strings are not omitted more than necessary, and the quantity of the information to be transmitted to the driver increases. Further, because overlap of a plurality of character strings is judged by a simple shape of the rectangle, the minimum and maximum values in the x- and y-axis directions may be merely compared between a plurality of character strings, and the operation time can be shortened.

Figure 38A:
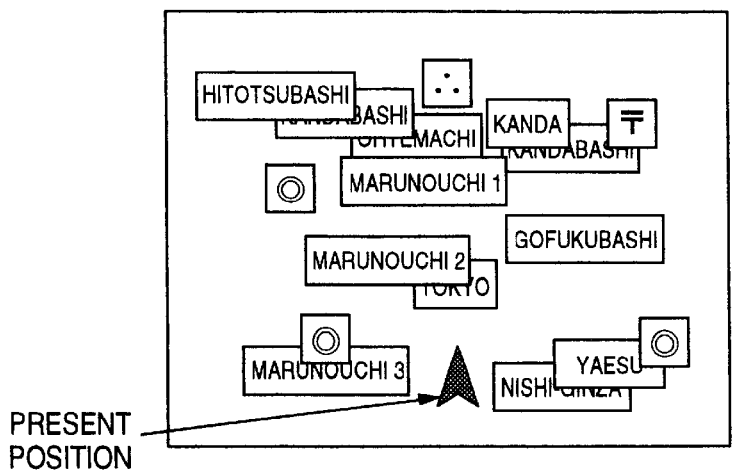
FIGS. 38A, 38B and 38C show an embodiment for avoiding character string overlap display in bird's-eye view map display.
Figure 38B:
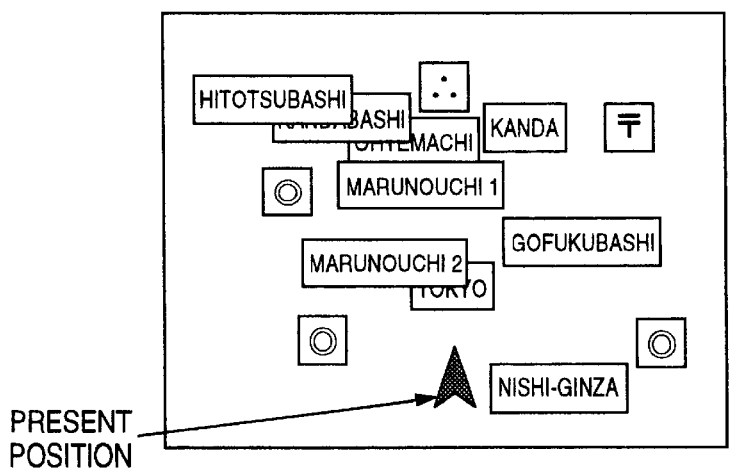
Figure 38C:
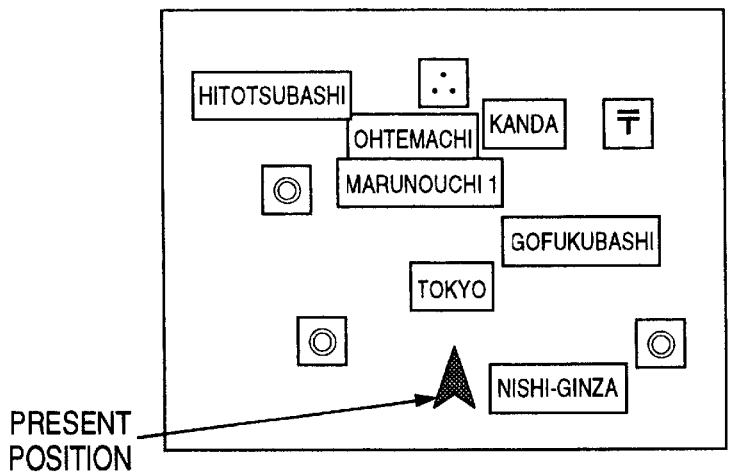
Figure 39A:
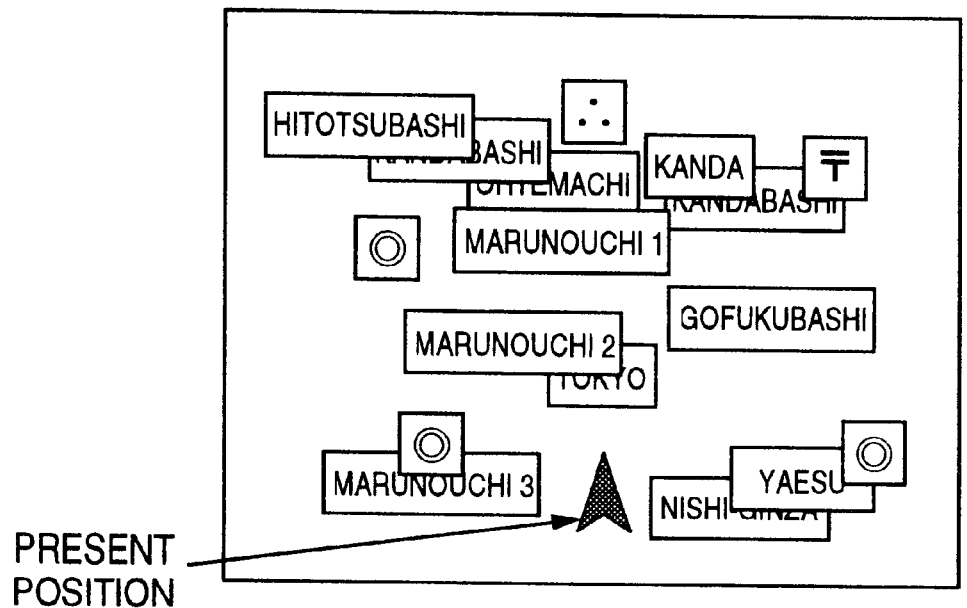
FIGS. 39A and 39B show an embodiment for avoiding character string overlap display in bird's-eye view map display.
Figure 39B:
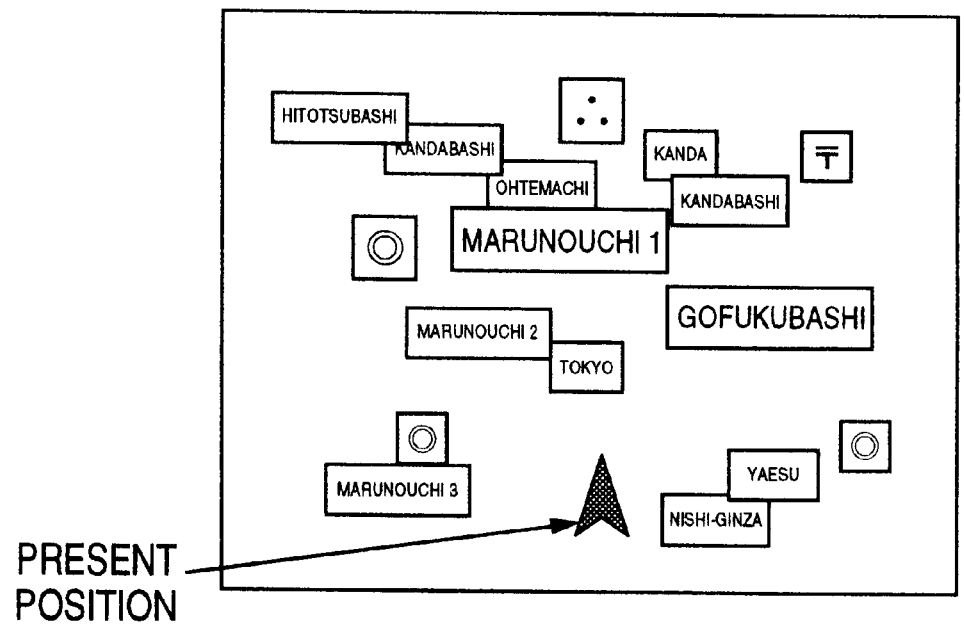
Figure 40A:
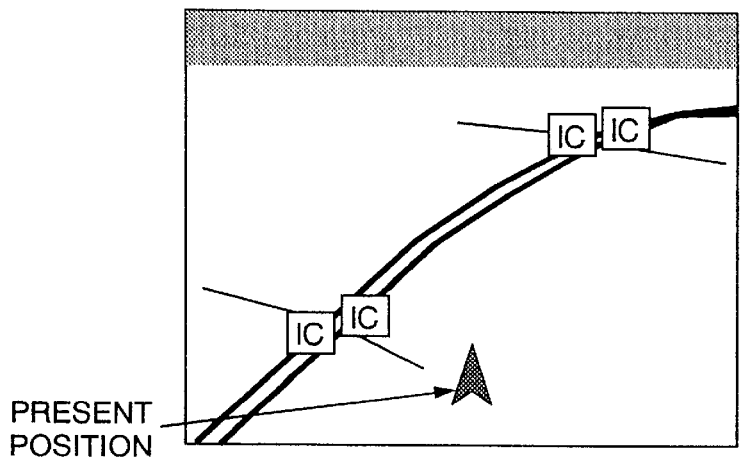
FIGS. 40A, 40B and 40C show an embodiment for displaying the same character string in bird's-eye view map display.
Figure 40B:
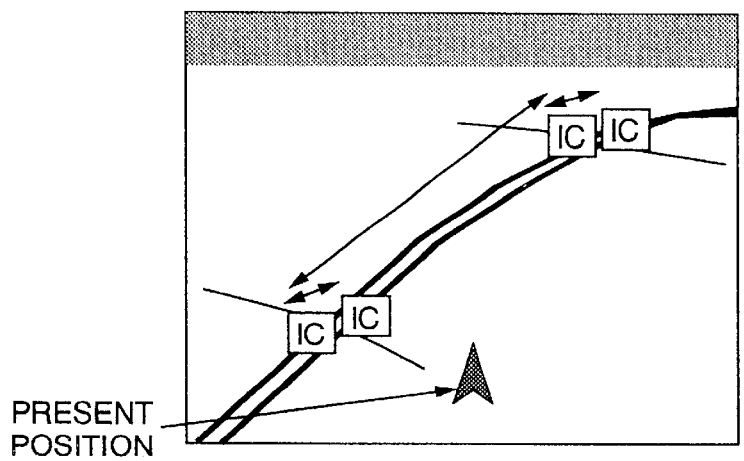
Figure 40C:
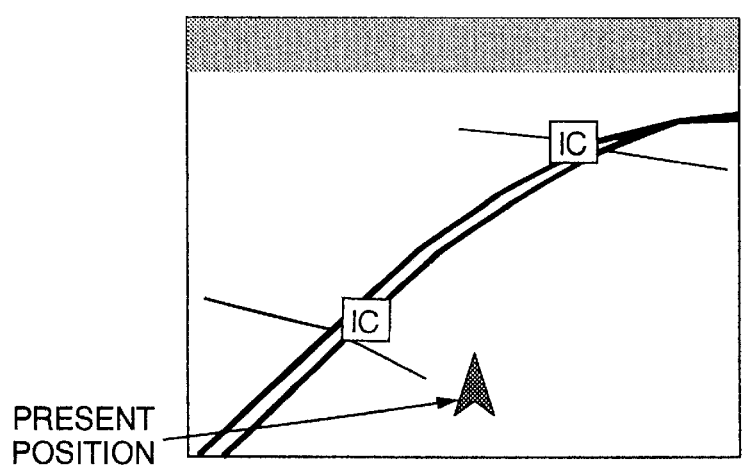

When overlap of the character strings is judged as existing after overlap is judged by any of the three kinds of character overlap judgement means described above, the attributes of the overlapping character strings are examined (step 1103). When the attributes of the overlapping character strings are judged as different, the character strings having the attributes which are decided as having higher priority for display are selected and are buffered (step 1104). Such an embodiment is shown in FIGS. 38A, 38B and 38C. It will be hereby assumed that the initial state has the screen structure such as shown in FIG. 38A, and comprises the symbol attributes constituted by symbols such as double circles and the post marks, and the character string attributes constituted by the character strings. If the symbol attributes are to be preferentially displayed when the processing of the step 1104 is executed, the symbol attributes are preferentially displayed when the character string and the symbol overlap with each other as shown in FIG. 38B. In other words, the position at which "double circle" and the place name "Marunouchi" overlap with each other is displayed by the "double circle" and at the position at which the postal symbol "〒" overlaps with the place name "Kandabashi" is displayed by the symbol "〒". Next, when the attributes of the character strings are judged as the same as a result of examination of the attributes of the overlapping character strings (step 1103), sorting is then effected in the depth-wise direction for the character string (step 1105). Further, the character string close to the present position is selected and is then buffered (step 1106). Such an embodiment is shown in FIG. 38C. Here, if the character strings overlap with each other when the processing of the step 1106 is executed, the character string closer to the present position is displayed. In other words, when the name "Tokyo" and the name "Marunouchi 2" overlap, "Tokyo" is displayed, and when the name "Hitotsubashi" and "Ohtemachi" overlap, "Ohtemachi" is displayed. The explanation given above deals with the method of selecting and displaying the character strings when the character strings overlap, but there is still another method which replaces display of the overlapping character strings by small fonts and displays them as shown in FIGS. 39A and 39B. In other words, when overlap of the character strings is judged as existing at the step 1102 in FIG. 14, these character strings are displayed in the font size smaller than the designated font size. If the designated font size of characters is 24×24 pixels, for example, display is made in the font size of 16×16 pixels or 12×12 pixels. Since overlap of the character strings becomes smaller as shown in FIG. 39B in this case, recognition performance of the character strings can be improved. Next, whether or not the same character string, which expresses the same characters in the same sequence, exists in the character strings is judged (step 1107). When the same character string is judged as existing, the distance between the character strings is then calculated (step 1108). Here, the term "distance between the character strings" represents the difference of the position data of the characters put on the map data or the difference of the position data of the characters when the character strings are displayed on the bird's-eye view map. To calculate the distance, it is advisable to use one point representing the character string, that is, the upper left end point or the central point of the character string. Whether or not the distance between the character strings so calculated falls within a predetermined area is judged (step 1109) and when the result proves YES, the character strings in the proximity of the present position are buffered (step 1110). The operation example will be explained with reference to FIGS. 40A, 40B and 40C. Under the initial state shown in FIG. 40A, four character strings representing an interchange exist. The distances between these character strings are calculated as shown in FIG. 40B, and the character strings in the proximity of the present position, which has small distances, are selected, while both character strings are selected for those having large distances. In consequence, the character strings are displayed as shown in FIG. 40C. As can be clearly understood from these drawings, the character strings which are not necessary as the information are omitted and only the character strings which are absolutely necessary are left. Therefore, the driver can more easily recognize them.

Figure 15:
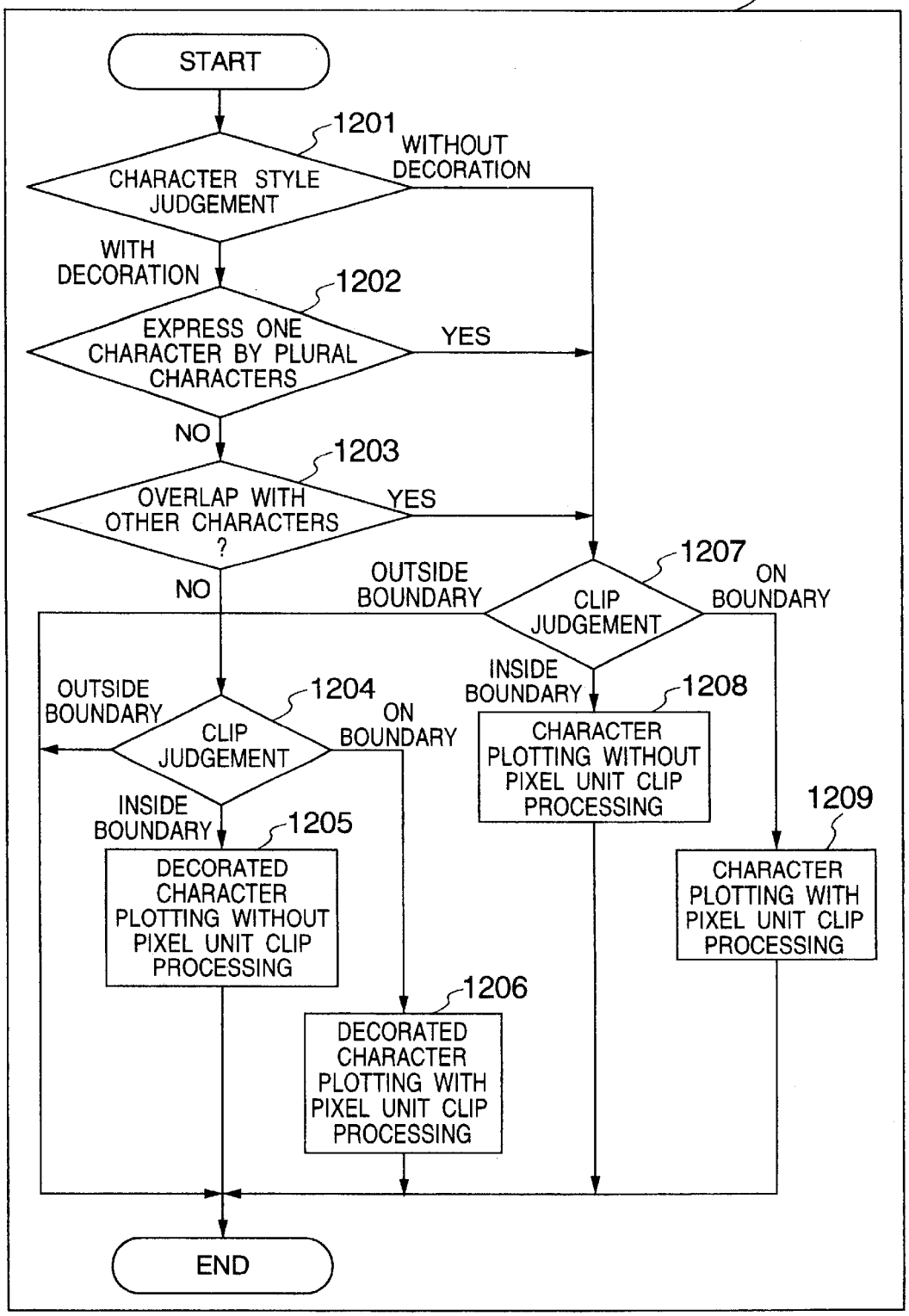
FIG. 15 is a flowchart of character plotting means.

Next, the character plotting means 1185, which can be inserted as a subroutine to the final step of the flowchart shown in FIG. 14, will be explained concretely with reference to FIG. 15.

Here, whether or not decorated characters, or the like, are designated as a character style is first judged (step 1201). The decorated characters include bold-faced characters having a thick character line so as to highlight the characters and fringed characters having a background color or a frame of a designated specific color around the lines constituting a given character in order to have the character more comprehensible when it is displayed in superposition in a region where a large number of lines and planes are displayed as the background. Reference numeral 2181 in FIG. 18A represents an example of such a fringed character. This fringed character can be plotted in the following way. First, character plotting is effected for a character to be fringed at a position of one dot 2182 (FIG. 18B) from the upper left of the coordinates in which the object character is to be plotted, in the background color. Further, character plotting is effected eight times, in total, in the same way by using the background color at an upward position by one dot 2183 (FIG. 18C), at a right upward position by one dot 2184 (FIG. 18D), at a left position by one dot 2185 (FIG. 18E), at a right position by one dot 2186 (FIG. 18F), at a left downward position by one dot 2187 (FIG. 18G), at a downward position by one dot 2188 (FIG. 18H) and at a right downward position by one dot 2189 (FIG. 18I), respectively. Finally, the intended character is plotted at the designated coordinates position in the designated color (2191 in FIG. 18J). As a modified example of the fringed characters, there is a method which displays the background color in the predetermined directions of the character, for example, to the right, down and right downward, or a frame having a designated specific color.

Figure 17A:
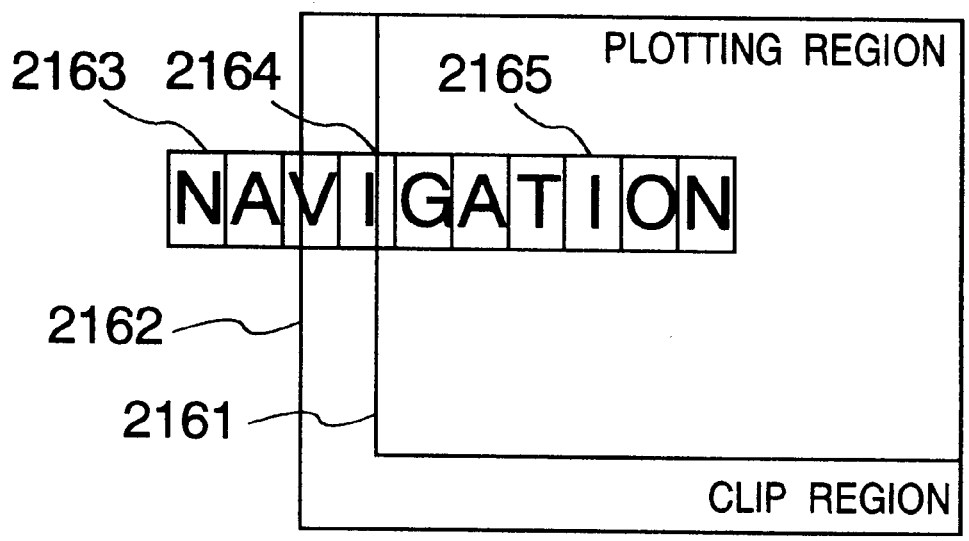
FIGS. 17A and 17B show an embodiment for character clipping processing.
Figure 17B:
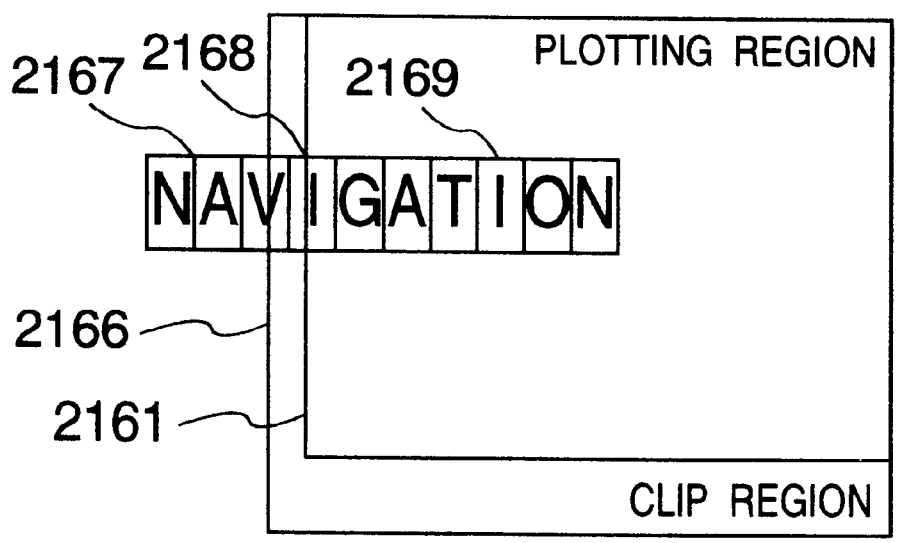
Figure 19:
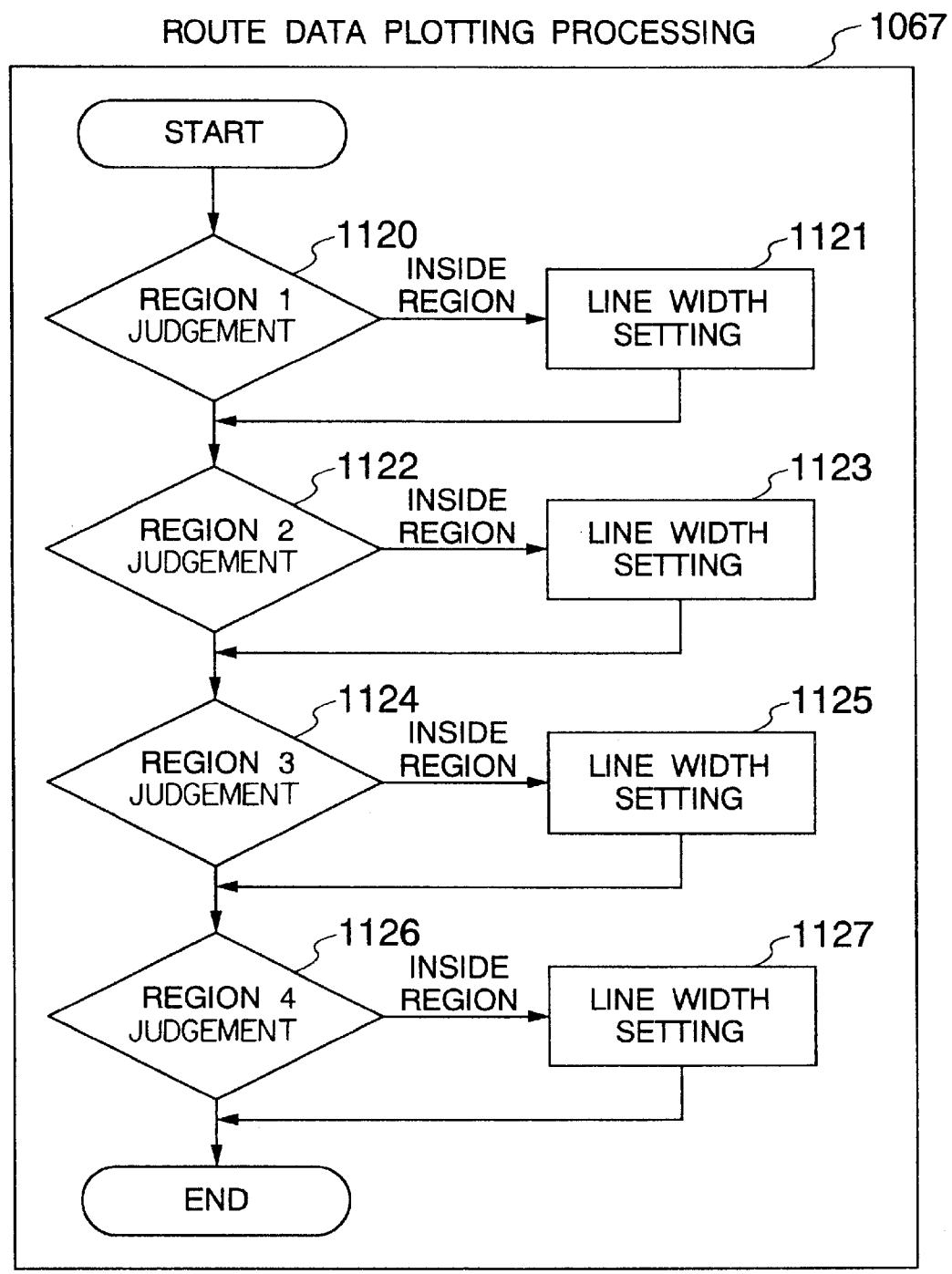
FIG. 19 is a flowchart of a route display in bird's-eye view map display.

When the character is not judged as the decorated character in the character style judgement, the relation between the designated character and the clip region is judged by clip judgement (step 1207) so as to call the character plotting routine having, or not having, the clip in the pixel unit. The clip processing routine compares the character plotting start coordinates, for example, the left lower end point of the designated character, with the clip region and judges whether or not the left lower end point of this character is contained in the clip region 2162, the plotting region 2161 or other regions, as shown in FIGS. 17A and 17B. By the way, when the character to be plotted is the standard character, the clip region is expanded to the left by the width of the character and in the down direction by the height of the character from the plotting region. Assuming that the height of the standard character and the half-size character is h, the width of the standard character is w, the width of the half-size character is w', the left lower end point of the plotting region is (x1, y1) and the right upper end point is (x2, y2), for example, the left lower end point of the clip region in the standard character is (x1-w, y1-h), its right upper end point is (x2, y2), the left lower end point of the clip region in the half-size character is (x1-w', y1-h) and its right upper end point is (x2, y2). The left lower end points of the characters indicated by reference numerals 2163 and 2167 in FIGS. 17A and 17B exist outside the clip region. Therefore, the characters are clipped by clipping and nothing is plotted. The left lower end points indicated by reference numerals 2164 and 2168 in FIGS. 17A and 17B exist inside the clip region but are not contained in the plotting region. Therefore, the routine for executing the clip processing on the pixel unit is called, and character plotting is reliably executed, though the processing speed is not high (step 1209). The left lower end points of the characters indicated by reference numerals 2165 and 2169 in FIGS. 17A and 17B are contained in the plotting region. Therefore, the clip processing is omitted in the pixel unit, and character plotting is executed at a high processing speed (step 1208). Since the processing is executed in this way, high speed character plotting can be accomplished. Incidentally, the character plotting start coordinates are hereby set to the left lower end point of the character, but when the character plotting start coordinates are set to the position offset by a predetermined value from this left lower end point of the character, the offset distance may be added to the coordinates values of the plotting region and the clip region.

When the character is judged as having decoration in the character style judgement 1201, whether or not the designated character constitutes one character by a plurality of characters is judged (step 1202). As an example of one character string constituted by a plurality of characters 2142, there is a character 2141 of the shape having a size which exceeds the size that can be expressed by one character 2142 as shown in FIG. 16A. When decoration is applied in a character unit to such a character string, a fringe 2143 is displayed at the boundary of a respective character 2142 in the case of a fringed character, for example, as shown in FIG. 16B, and display quality drops. Therefore, when a plurality of characters are judged as constituting one character string, the flow jumps to the routine which does not put decoration to the characters. Incidentally, there is a method which examines the character codes and judges that a plurality of characters constitute one character string when the codes are within a predetermined region, as a method of judging that a plurality of characters constitute one character string. Accordingly, in the case of the decorated characters such as the fringed characters, too, the fringe 2143 is not displayed at the boundary of each character 2142 and display quality can be improved. The operations after the clip judgement 1207 are the same as in the foregoing explanation.

Next, when a plurality of characters are not judged as constituting one character string at the step 1202, whether or not the designated character is displayed in superposition with other characters is judged (step 1203). Here, whether or not the designated character overlaps with a plurality of characters that constitute one character is evaluated. The decorated characters such as the fringe characters intend to display more comprehensively those characters which overlap with the background information such as the lines and planes. When the decorated character such as the fringed character is displayed when overlapping characters exist as shown in FIG. 16C, the overlapped character string becomes difficult to discriminate. There is also the case where one symbol, or the like, is displayed by combining the character constituting one character by a plurality of characters with characters to be displayed in superposition with the former, and in such an application, the characters to be displayed in superposition need not be the decorated characters. Therefore, whether or not the designated character is displayed in superposition with other characters is examined at the step 1203, and when it is, the flow jumps to the routine which does not put decoration to the character. In consequence, display such as shown in FIG. 16D is executed, and intended display can be accomplished. The operations after the clip judgement 1207 is the same as in the foregoing embodiment.

Next, when the designated character is not judged as being displayed in superposition with other characters at the step 1203, plotting of the decorated characters is executed. The relation between the designated character and the clip region is judged by the clip judgement (step 1204) and the character plotting routine having, or not having, the clip in the pixel unit is called. The clip processing routine compares the plotting start coordinates of the character such as the left lower end point of the designated character with the clip region, and judges whether or not the left lower end point of the character is contained in the clip region 2162, the plotting region 2161 or other regions in FIGS. 17A and 17B. When, for example, the height of the character is h, the width of the character is w, the left lower end point of the plotting region is (x1, y1) and the right upper end point is (x2, y2), the lower end point of the clip region is (x1-w, y1-h) and the right upper end point is (x2, y2). When the left lower end point of the character exists outside the clip region, it is excluded by clipping and nothing is plotted. When the left lower end point of the character exists inside the clip region and is not contained in the plotting region, plotting of the decorated character is reliably executed by the clip processing in the pixel unit, though the processing speed is not high (step 1206). When the left lower end point of the character is contained in the plotting region, the clip processing in the pixel unit is omitted, and plotting of the decorated character is executed at a high processing speed (step 1205). When such a processing is executed, character plotting can be accomplished at a high speed. In this explanation, the plotting start coordinates of the character are set to the left lower end point of the character, but when the plotting start coordinates of the character are set to a point offset by a certain predetermined value from this left lower end point of the character, this offset may be added to the coordinates value of the boundary between the plotting region and the clip region.

Next, whether or not the route data exists in the plotting data is judged (step 1066). When the route data is judged as existing in the route memory means, the processing shifts to the route data plotting processing (step 1067). The route data plotting processing 1067 divides the region in which the map is practically displayed into a plurality of zones in the depth-wise direction, and applies necessary processing in each region. The explanation will be given hereby on the case where the region is divided into four zones. First, whether or not the route data exists in the foremost front side region 1 inclusive of the present position is judged (step 1120) and when the result proves YES, the line width for displaying the route is set to the greatest width (e.g. 9-dot width; step 1121). Next, whether or not the route data exists in the region 2 above the region 1 is judged (step 1122) and when the result proves YES, the line width representing the route is set to the width smaller than that of the step 1121 but greater than that of the step 1125 (e.g. 7-dot width: step 1123). Next, whether or not the route data exists in the region 3 above the region 2 is judged (step 1124), and when the result proves YES, the line width representing the route is set to the width smaller than that of the step 1123 but greater than that of the step 1127 (e.g. 5-dot width; step 1125). Finally, whether or not the route data exists in the deepest region 4 is judged (step 1126) and when the result proves YES, the line width representing the route is set to a width smaller than that of the step 1125 (e.g. 3-dot width; step 1127). When plotting is carried out in this manner, the forehand route can be displayed thinly and the depth route, thickly, as shown in FIG. 42B unlike the prior art system which does not have the feel of three-dimensional depth shown in FIG. 42A. Accordingly, the driver can recognize very naturally the route data. Incidentally, the explanation is hereby given on the system which divides the region and changes the line width for each divided region. However, it is also possible to employ the method which displays the routes close to the present position by a thicker line and the routes away from the present position by a thinner line.

Figure 20:
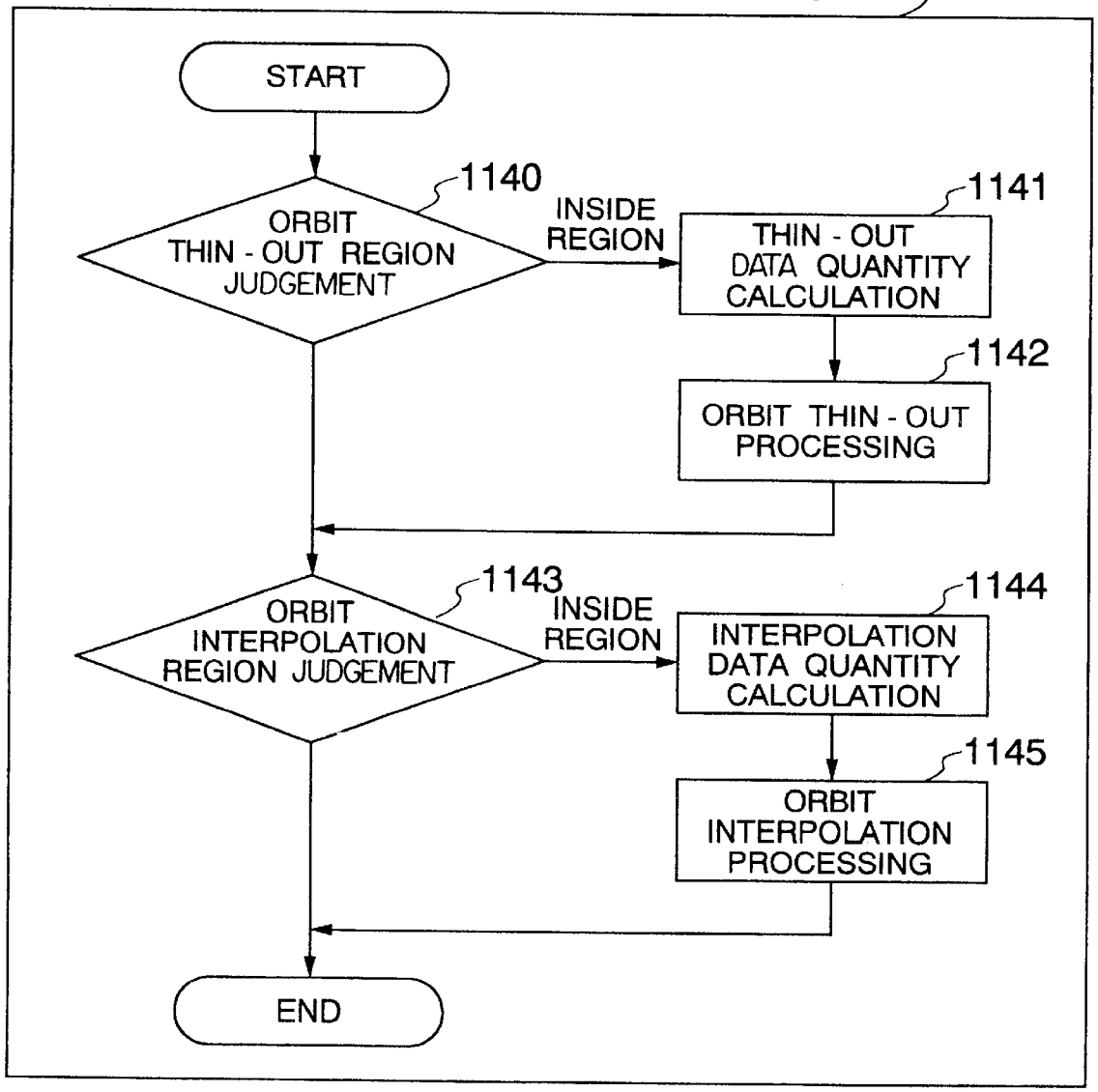
FIG. 20 is a flowchart of orbit display in bird's-eye view map display.

Next, whether or not the orbit data exists in the plotting data is judged (step 1068). When the orbit data is judged as existing, the processing shifts to the orbit data plotting processing (step 1069) shown in FIG. 20. Incidentally, this orbit data is stored in the orbit memory means 69 storing therein the driving position in a predetermined distance interval. Generally, when the orbit data is displayed on the map by bird's-eye view map display, the gap of the points representing the orbit near the present position becomes great, whereas time gap of the points representing the orbit becomes small at the positions away from the present position. Therefore, there occurs the case from time to time where the points of the orbit overlap with one another. To solve this problem, in the orbit data plotting processing (step 1069), orbit thinning-out region judgement means (step 1140) for judging whether the region for which the orbit is to be plotted is away from the present position, switches the processing to the step 1141 if the orbit is the orbit of the position away from the present position. Thinning-out data quantity calculation means (step 1141) decides the thinning-out quantity of the orbit data displayed so that the gap of the points representing the orbit becomes easily comprehensible when bird's-eye view map display is executed (step 1141). The orbit thinning-out processing (step 1142) thins out the orbit data, which need not be displayed, from the data to be displayed in accordance with the thinning-out quantity of the orbit data determined by the step 1141, and prevents the orbit data from being displayed for the positions away from the present position. Next, the orbit interpolation region judgement means (step 1143) for judging if the region for which the orbit is to be plotted is near the present position, judges whether or not the orbit to be displayed is near the present position, and when the orbit is judged as being near the present position, the processing shifts to the step 1144.

The interpolation data quantity calculation means (step 1144) decides the orbit data quantity to be interpolated afresh between the orbit and the orbit so that the gap of the points representing the orbit reaches the comprehensible data quantity when bird's-eye view map display is executed (step 1144). The orbit interpolation processing sets the orbit data to be afresh displayed between the orbit and the orbit and on the driving road in accordance with the interpolation quantity of the orbit data decided by the step 1144, prevents the interval between the orbit data from becoming too great and displays comprehensibly the roads that have been taken in the proximity of the present position (step 1145).

Figure 43A:
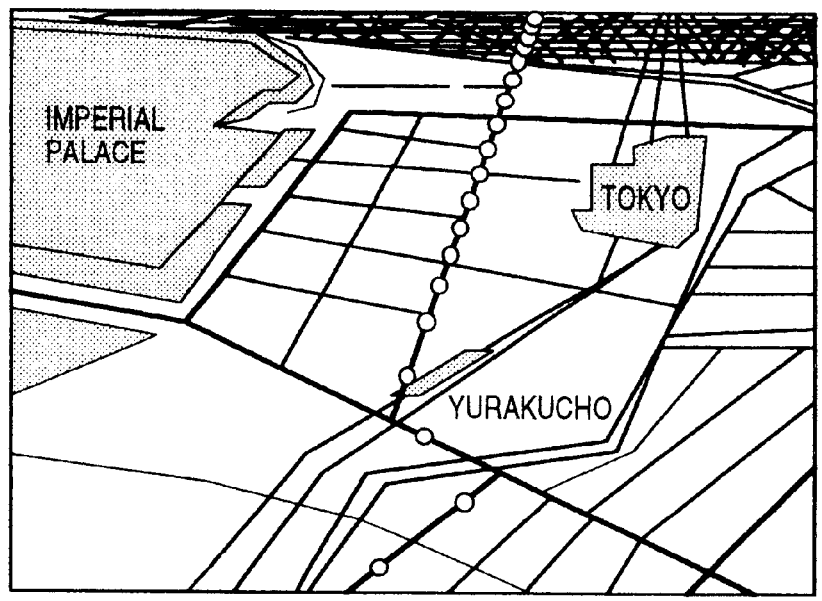
FIGS. 43A and 43B show an embodiment for orbit display in bird's-eye view map display.
Figure 43B:
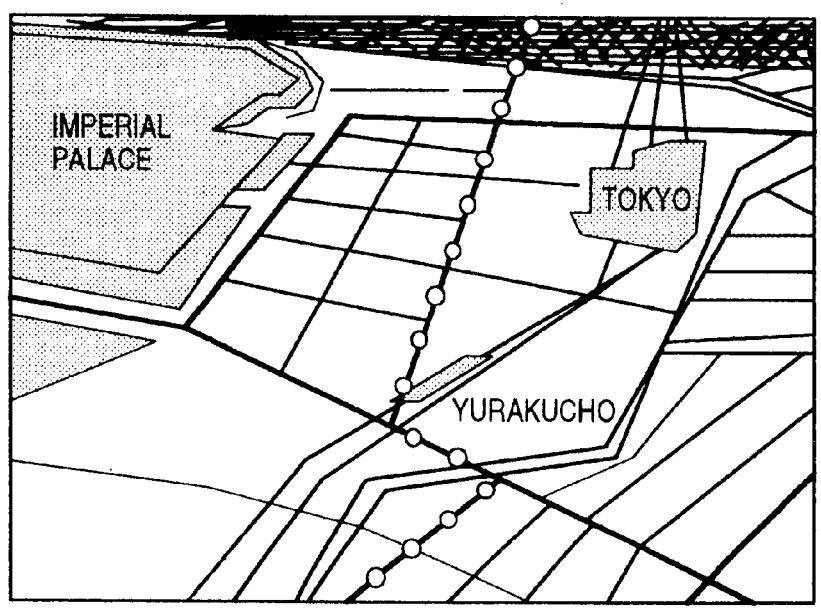

Next, the orbit display examples are shown in FIGS. 43A and 43B. In the prior art system, the orbit data represented by the circles o is displayed in such a manner as to broaden at portions in the proximity of the present position and to narrow at portions away from the present position as shown in FIG. 43A. In the present system, on the other hand, the orbit data is displayed with equal gaps at the portions in the proximity of the present position and at the portion away from it as shown in FIG. 43B. Accordingly, display quality can be improved and the roads containing the orbits can be more easily recognized. Therefore, the orbit recognition factor by the driver can be improved.

Figure 21:
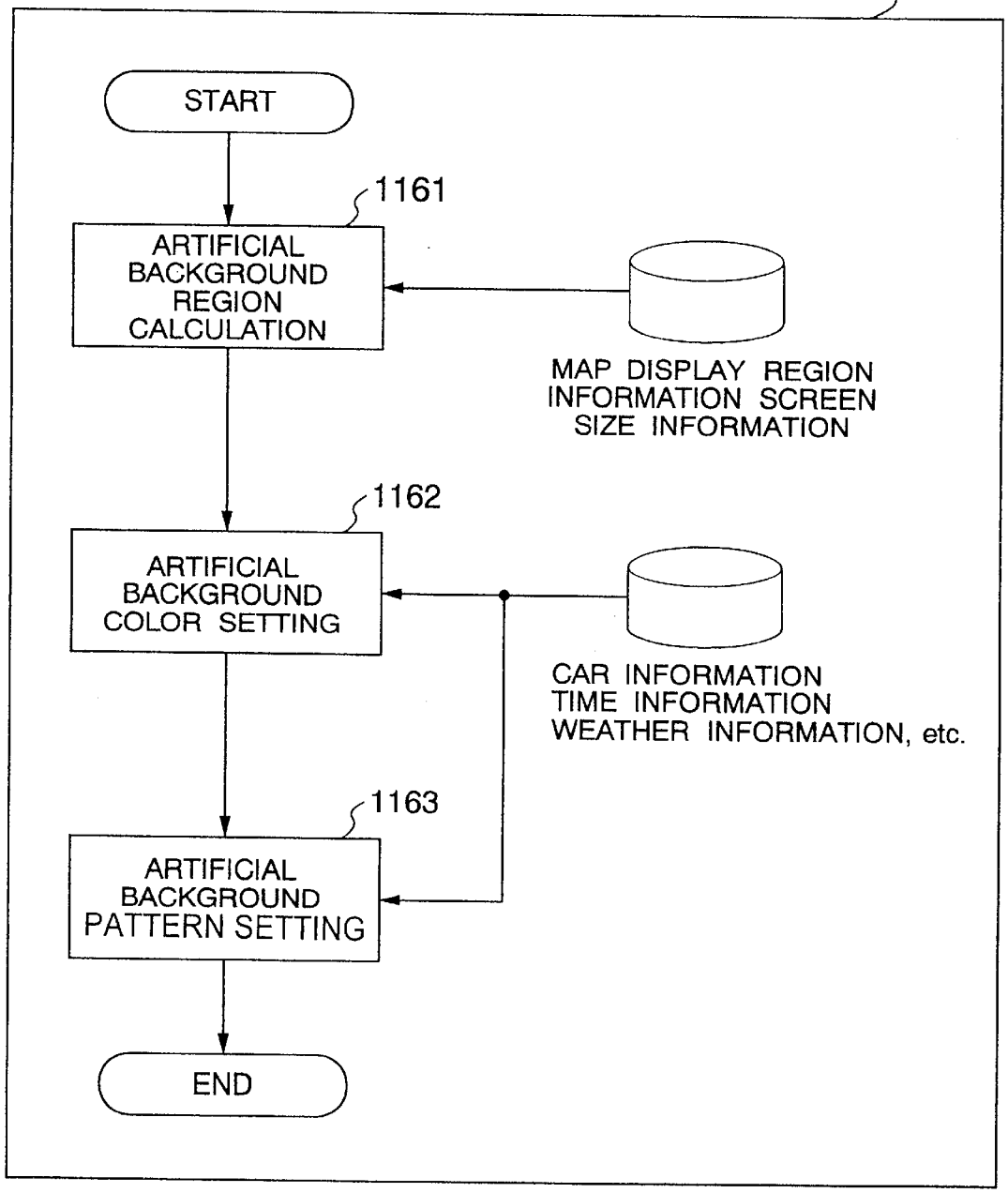
FIG. 21 is a flowchart of artificial background display in bird's-eye view map display.
Figure 44A:
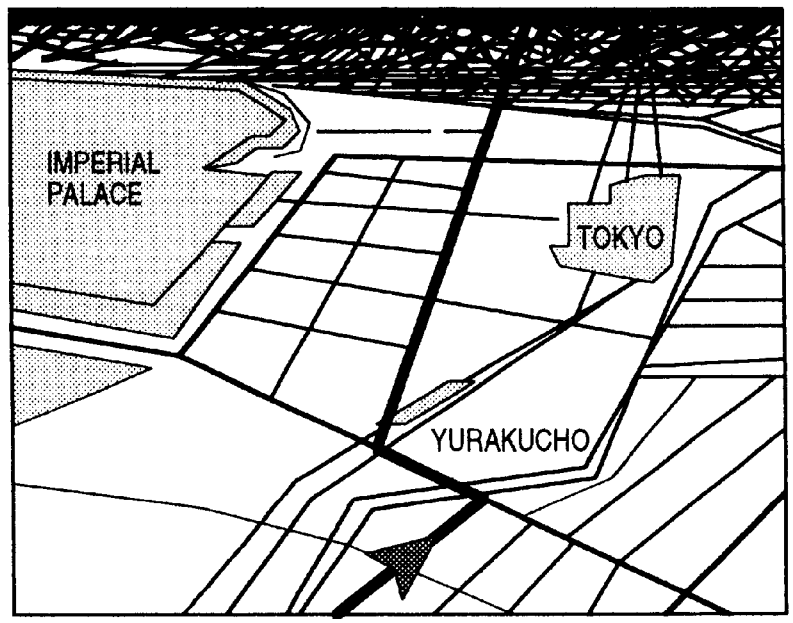
FIGS. 44A and 44B show an embodiment for artificial background display in bird's-eye view map display.
Figure 44B:
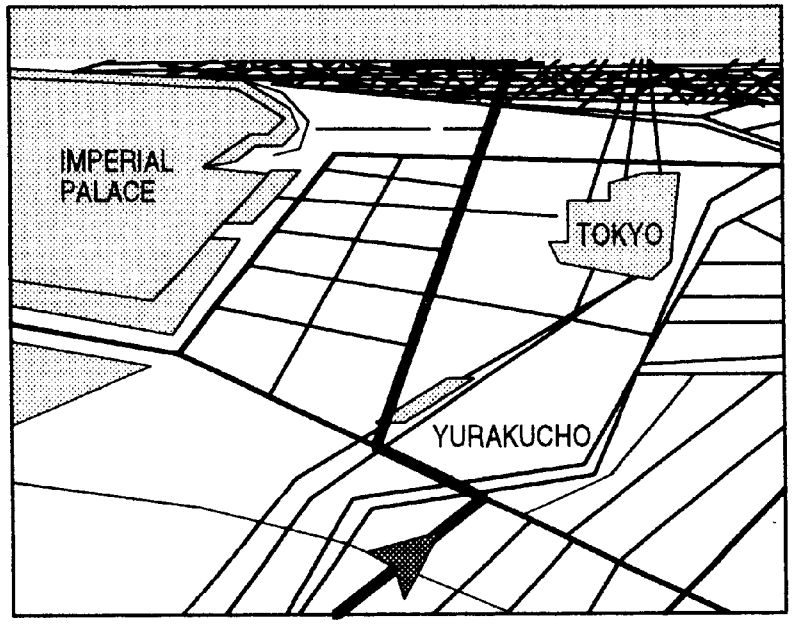

The explanation given above explains the plotting processing method of the objects constituting the bird's-eye view map. Next, the method of plotting the artificial background such as the sky and the horizon will be explained. One of the problems encountered in bird's-eye view map is that when the map of the far places from the present position is displayed as shown in FIG. 44A, its reduced scale becomes small, an extremely enormous quantity of map data are necessary in plotting, an elongated time is necessary for display and high speed response cannot be obtained. To solve this problem, the inventors of the present invention have proposed the method which limits the far region from the present position to be displayed in the map so as to reduce the map data quantity and displays instead artificial objects such as a horizon, a sky, and so forth. More concretely, the display region judgement means 81 shown in FIG. 8 decides the region to be displayed practically on the map. After the bird's-eye view map is displayed through the subsequent means 82 to 85, the artificial background setting means 86 sets the data of the artificial background. The content of this processing will be explained with reference to FIG. 21. First, an artificial background region calculation means (step 1161) reads out the region information whose map is decided to be displayed by the display region judgement means 81, and decides the region for which the artificial background is displayed, from the difference between this region information and the screen size information. Next, artificial background color setting means (step 1162) and artificial background pattern setting means (step 1163) decide the colors of the background region and its pattern on the basis of various information such as the car information and the time information. The method of deciding the colors on the basis of the car information will be hereby explained by way of example. The car information S10 is inputted to the processor portion through the car LAN 11. When a side marker lamp of the car is lit at this time, it means that the surroundings are dark and the time can be judged as night. Therefore, the artificial background is displayed in black or grey. When the side marker lamp is not lit, the time can be judged as daytime. Therefore, the artificial background is displayed in blue. When the blue color cannot be displayed due to the color palette, it is advisable to conduct dither processing which sets the pattern so that the blue color and the white color are sequentially displayed.

Next, another embodiment which obtains the similar effect by a different means will be explained. In the navigation apparatus, the date and the time can be acquired by receiving and analyzing the signals from the GPS satellite. The artificial background can be displayed by using this information so that the blue color is displayed when the time is judged as daytime and the black or grey color is displayed when the time is judged as night. The artificial background may be displayed in red representing the morning or evening glow for the morning or the evening. Next, still another embodiment for obtaining the similar effect by a different means will be explained. This is the system which displays the artificial background in blue when the weather is fine and in grey when the weather is rainy or cloudy, by using the weather information contained in the information S9 received by the traffic information receiver 10. Since the artificial background is displayed to match with the surrounding conditions by these means, the driver can easily judge what is represented by the artificial background.

Figure 22:
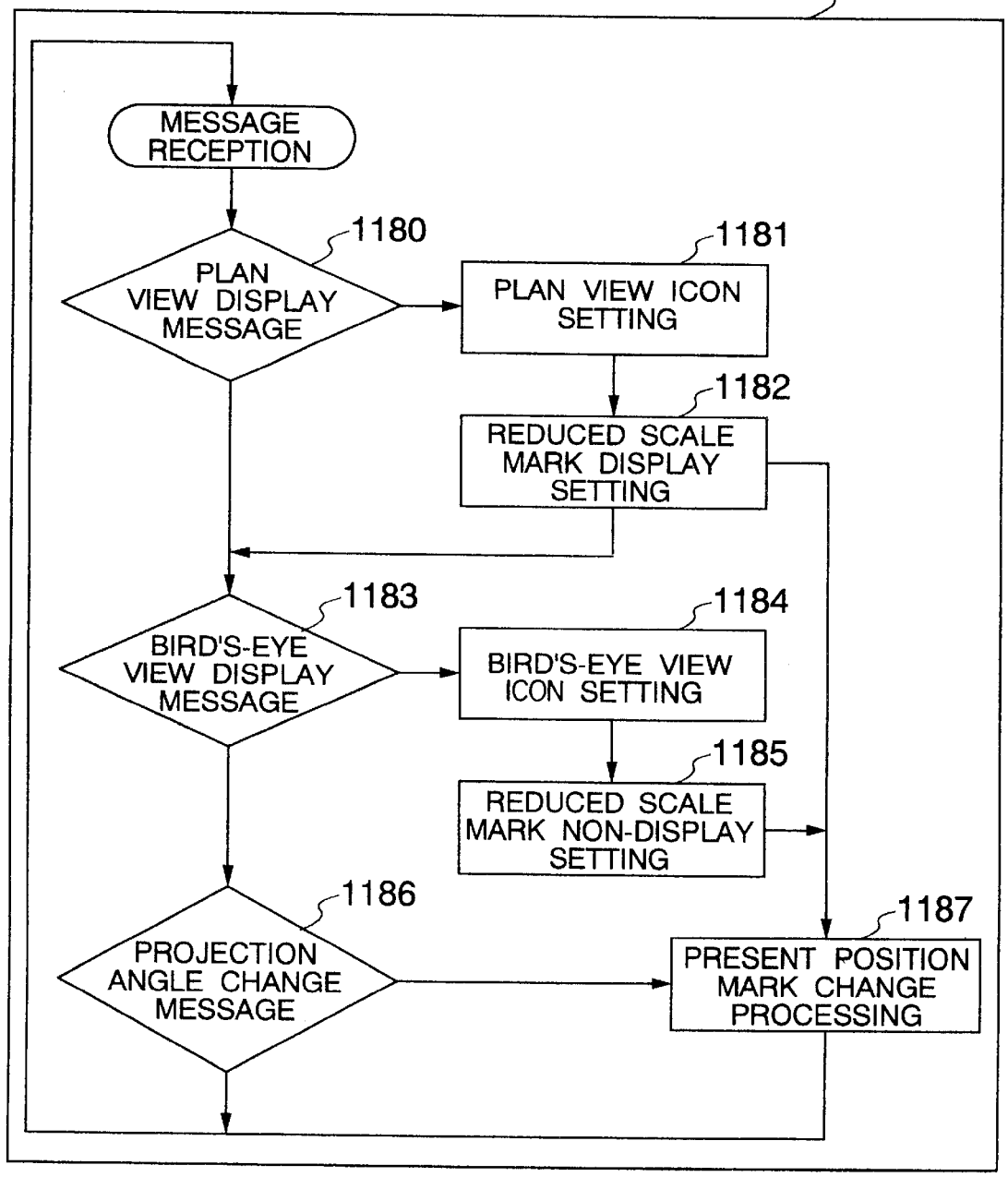
FIG. 22 is a flowchart of mark display in plan view map display and bird's-eye view map display.
Figure 45A:
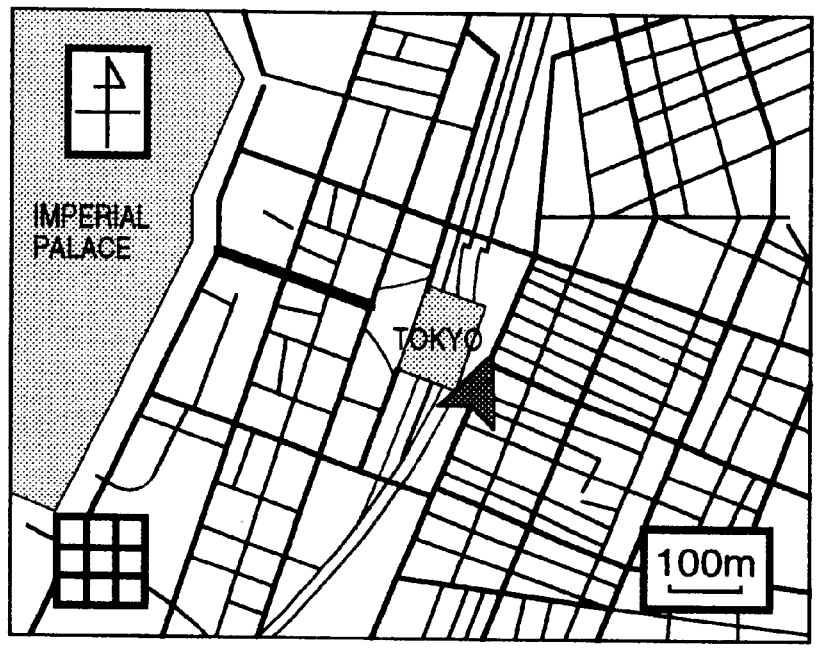
FIGS. 45A and 45B show an embodiment for mark display in plan view map display and bird's-eye view map display.
Figure 45B:
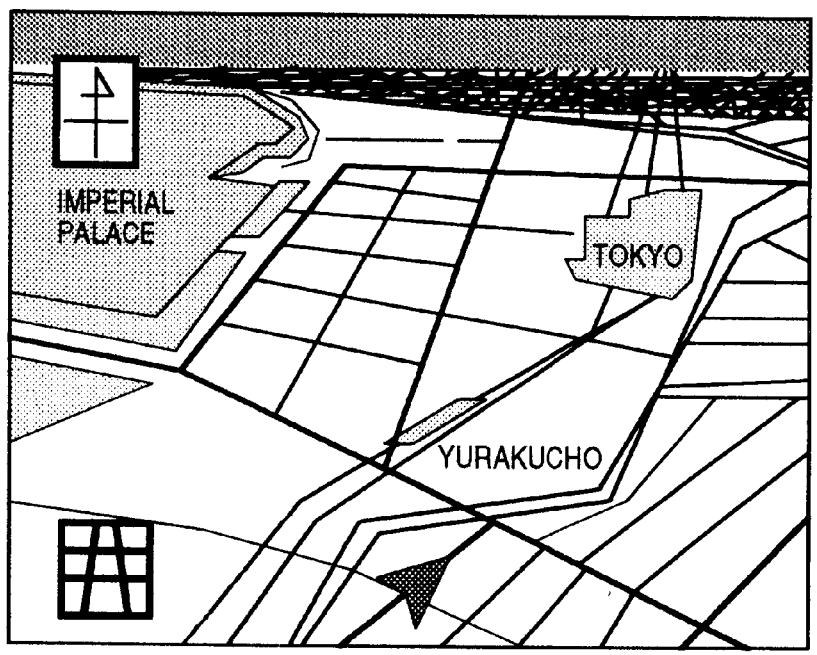
Figure 46A:
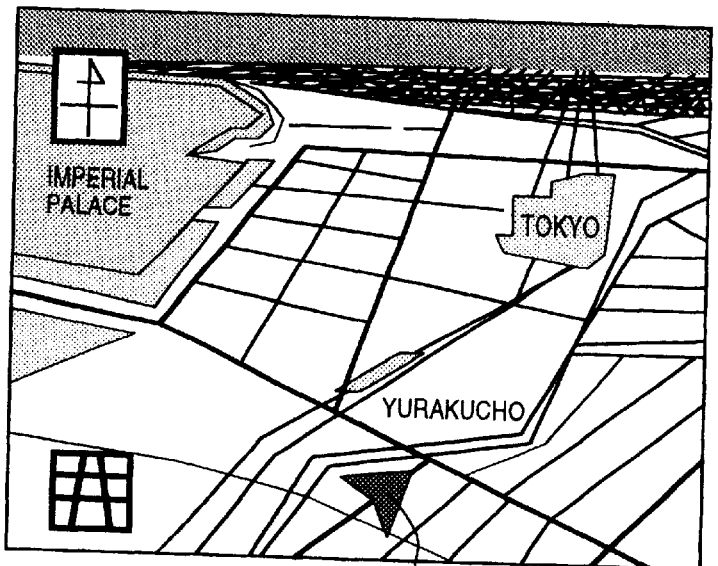
FIGS. 46A and 46B show an embodiment for present position mark display in bird's-eye view map display.
Figure 46B:
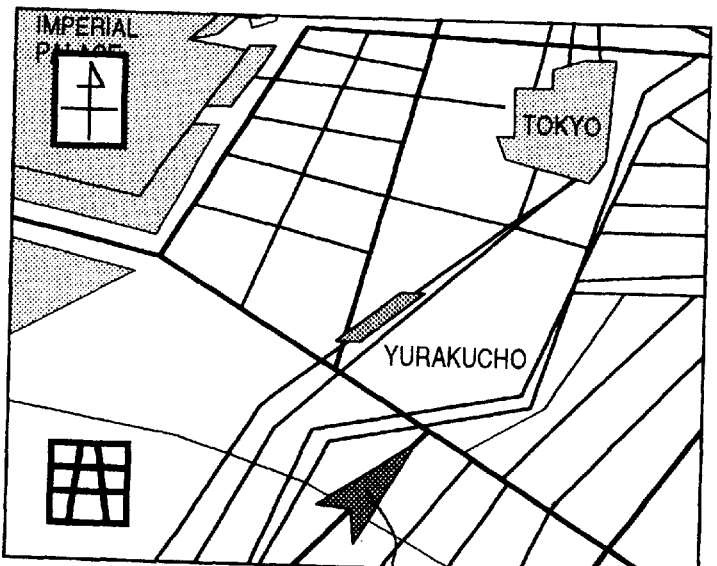

Next, display means for the additional information such as the means to be displayed in superposition with the bird's-eye view map will be explained. The navigation apparatus for displaying the bird's-eye view map improves the user interface by displaying the information representing by which system the map presently displayed is plotted, in superposition with the map. Menu plotting means 70 for executing this processing will be explained with reference to FIG. 22. The content of the user's operation is transmitted by the input device 5 to the user operation analysis means 61, where the content is analyzed. When the necessity of display by the menu plotting means 70 is judged as existing, the content is transmitted to the menu plotting means 70 by using a message. Receiving this message, the menu plotting means starts its processing and judges whether or not the request of this message is the display request of the plan view map (step 1180). When the message is judged as the one requesting the display of the plan view map, a mark representing that the plan view map such as shown at the lower left of FIG. 45A is now being displayed is displayed (step 1181). Further, the mark representing the reduced scale of the map displayed at present is displayed (at the lower right of FIG. 45A; step 1182). When the message is not the one described above, whether or not the request of the message is the display request of the bird's-eye view map is judged (step 1183). When it is judged as the message requesting display of the bird's-eye view map, the mark representing that the bird's-eye view map is now being displayed, such as the one shown at the lower left of FIG. 45B, is displayed (step 1184). Further, the mark representing the reduced scale of the map presently displayed is turned off (step 1185). When the message is not the one described above (step 1186), whether or not the request of the message is the change request of the projection angle $\theta$ in the bird's-eye view map is judged (step 1186). When it is judged as the message requesting the change of the projection angle $\theta$, the shape of the mark representing the present position shown in FIG. 45B is changed in accordance with the projection angle $\theta$ as shown in FIGS. 46A and 46B (step 1187). When the projection angle $\theta$ is close to 0°, that is, when the bird's-eye view map is close to the plan view map, the shape of the present position mark is brought into conformity with the shape of the present position mark in the plan view map display, and as the projection angle $\theta$ approaches 90°, the shape of the present position mark is subjected to perspective conversion in accordance with the projection angle $\theta$ and a present position mark having the converted shape is used for display. As a result of the processing described above, the driver can easily judge the display mode of the map and the display region, so that recognition performance can be improved.

The foregoing embodiments can reduce overlap of the character strings in the bird's-eye view map display, eliminate the necessary for the user to estimate what is the character string displayed, from the relation between the preceding and subsequent character strings, and can make the character strings and the symbols more easily comprehensible. Because the bird's-eye view map is easily recognizable even while the driver is driving, safety can be further improved.

Since display of the same character string is eliminated in the bird's-eye view map display, the bird's-eye view map can be displayed more simply. In consequence, the bird's-eye view map can be recognized more easily even while the driver is driving, and safety can be further improved.

Because the route near the view point is displayed more thickly than the routes away from the view point in the bird's-eye view map display, the map can be expressed more three-dimensionally. Therefore, the user can easily acquire the feel of depth of the bird's-eye view map, and a more comprehensible map can be obtained.

Further, because the dot strings representing the driving orbit in the bird's-eye view map display are expressed with suitable gaps at both portions away from the view point and portions near the view point, the phenomenon in which the gaps of the dot strings representing the orbit becomes great, that occurs in the proximity of the view point, as well as the phenomenon in which the gaps of the dot strings representing the orbit becomes narrower than necessary, that occurs at portions away from the view point, can be avoided, and display quality of the bird's-eye view map and the driving orbit can be improved.

Display quality of the patterns contained in the lines and the planes in the bird's-eye view map display somewhat drops, but because the display time can be shortened, the time necessary for displaying the bird's-eye view map becomes shorter. Therefore, the redisplay cycle of the bird's-eye view map becomes shorter, and the bird's-eye view map can be displayed more really.

The artificial background representing the virtual sky and horizon are so displayed as to correspond to the surrounding condition in the bird's-eye view map display. Therefore, the user is not perplexed unnecessarily.

Further, the user can easily judge that the map presently displayed is the bird's-eye view map or the plan view map. Since the present condition is displayed in such a manner as to correspond to the change of the view point, the navigation apparatus becomes easier to use and safety can be improved.

Since the destination is always displayed in a predetermined direction, the driver can drive the car while confirming always the direction of the destination.

Since the information desired by the driver is preferentially displayed, the necessity for the driver to conduct unnecessary operations decreases during driving, safety can be therefore improved further.

What is claimed is:

1. A map display apparatus comprising:
a map data memory which stores map data necessary for drawing a map of a predetermined region;
a map display which reads map data out of the map data memory and draws a bird's-eye view display by projecting the map data read out from the map data memory onto a projection plane which makes a projection angle with a plane of the map data read out from the map data memory, the projection angle being greater than 0° and less than 90°, the bird's-eye view display including identifying marks which identify items in the bird's-eye view display; and
an identifying mark overlap preventer which prevents identifying marks from overlapping one another in the bird's-eye view display.

2. A map display apparatus according to claim 1, wherein each of the identifying marks has an attribute selected from a plurality of different attributes having mutually different priorities for display; and
wherein the identifying mark overlap preventer prevents two identifying marks which have two different attributes having two mutually different priorities for display from overlapping one another in the bird's-eye view display by selecting for display in the bird's-eye view display only one of the two identifying marks which has an attribute having a higher priority for display than an attribute of another one of the two identifying marks.

3. A map display apparatus according to claim 2, wherein the identifying marks include map symbols and character strings;
wherein the map symbols have an attribute which is different from an attribute of the character strings and has a higher priority for display than the attribute of the character strings; and
wherein the identifying mark overlap preventer prevents a map symbol and a character string from overlapping one another in the bird's-eye view display by selecting for display in the bird's-eye view display only the map symbol which has the attribute having the higher priority for display than the attribute of the character string.

4. A map display apparatus according to claim 1, wherein each of the identifying marks has an attribute selected from a plurality of different attributes having mutually different priorities for display; and
wherein the identifying mark overlap preventer prevents two identifying marks both having a same attribute from overlapping one another in the bird's-eye view display by selecting for display in the bird's-eye view display only one of the two identifying marks.

5. A map display apparatus according to claim 4, wherein the identifying mark overlap preventer selects for display in the bird's-eye view display only one of the two identifying marks which is closer to a selected point in the bird's-eye view display.

6. A map display apparatus according to claim 5, wherein the selected point in the bird's-eye view display is a present position of a user of the map display apparatus.

7. A map display apparatus according to claim 1, wherein the map display displays the identifying marks in the bird's-eye view display in a designated size by default; and
wherein the identifying mark overlap preventer substantially prevents two identifying marks from overlapping one another in the bird's-eye view display by controlling the map display to display the two identifying marks in the bird's-eye view display in a size which is smaller than the designated size.

8. A map display apparatus according to claim 7, wherein the identifying marks include character strings;
wherein the map display displays the character strings in the bird's-eye view display in a designated font size by default; and
wherein the identifying mark overlap preventer substantially prevents two character strings from overlapping one another in the bird's-eye view display by controlling the map display to display the two character strings in the bird's-eye view display in a font size which is smaller than the designated font size.

9. A map display apparatus according to claim 1, wherein the identifying marks include orbit marks identifying a route in the bird's-eye view display; and
wherein the identifying mark overlap preventer prevents orbit marks from overlapping one another in the bird's-eye view display by thinning out orbit marks which overlap one another so that the map display displays only orbit marks which do not overlap one another in the bird's-eye view display.

10. A map display apparatus according to claim 9, wherein the route in the bird's-eye view display identified by the orbit marks is a route which has been traveled by a user of the map display apparatus.

11. A map display apparatus according to claim 1, further comprising a duplicate identifying mark display preventer which prevents two identical identifying marks from appearing within a predetermined distance of one another in the bird's-eye view display by selecting for display in the bird's-eye view display only one of the two identical identifying marks.

12. A map display apparatus according to claim 11, wherein the duplicate identifying mark display preventer selects for display in the bird's-eye view display only one of the two identifying marks which is closer to a selected point in the bird's-eye view display.

13. A map display apparatus according to claim 12, wherein the selected point in the bird's-eye view display is a present position of a user of the map display apparatus.

14. A map display apparatus according to claim 1, wherein the map display displays in the bird's-eye view display a present position mark indicating a present position of a user of the map display apparatus;
wherein the map display enables the user to change the projection angle which the projection plane makes with the plane of the map data read out from the map data memory; and
wherein the map display changes the present position mark in accordance with a change in the projection angle.

15. A map display apparatus according to claim 14, wherein the map display changes a shape of the present position mark in accordance with the change in the projection angle.

16. A map display apparatus according to claim 1, wherein the map display displays an artificial sky area in a portion of the bird's-eye view display.

17. A map display apparatus according to claim 16, wherein the map display displays at least a portion of the artificial sky area in place of some of the map data read out from the map data memory to reduce an amount of map data which is displayed in the bird's-eye view display.

18. A map display apparatus according to claim 17, wherein the map display displays at least a portion of the artificial sky area in place of map data read out from the map data memory corresponding to a region of the bird's-eye view display which is furthest from a selected point in the bird's-eye view display to reduce an amount of map data which is displayed in the bird's-eye view display.

19. A map display apparatus according to claim 18, wherein the selected point in the bird's-eye view display is a present position of a user of the map display apparatus.

20. A map display apparatus according to claim 16, wherein the map display controls an appearance of the artificial sky area to represent a present appearance of an actual sky viewable by a user of the map display apparatus.

21. A map display apparatus according to claim 20, wherein the map display changes a color of the artificial sky area in accordance with an actual time of day experienced by the user of the map display apparatus.

22. A map display apparatus according to claim 20, wherein the map display changes a color of the artificial sky in accordance with a real weather condition experienced by the user of the map display apparatus.

23. A map display apparatus according to claim 1, wherein the map display enables a user of the map display apparatus to switch between the bird's-eye view display and a plan view display; and wherein the map display draws the plan view display by projecting the map data read out from the memory onto a projection plane which is parallel to a plane of the map data read out from the map data memory.

24. A map display apparatus according to claim 23, wherein when the map display displays the bird's-eye view display, the map display displays in the bird's-eye view display a mark identifying the display as the bird's-eye view display.

25. A map display apparatus according to claim 23, wherein when the map display displays the plan view display, the map display displays in the plan view display a mark identifying the display as the plan view display.

26. A map display apparatus according to claim 1, wherein the map display displays a selected route in the bird's-eye view as a line having a width which decreases with increasing distance from a selected point in the bird's-eye view display.

27. A map display apparatus according to claim 26, wherein the selected route in the bird's-eye view display is a route to be traveled by a user of the map display apparatus; and wherein the selected point in the bird's-eye view display is a present position of a user of the map display apparatus.

28. A navigation apparatus comprising:
a map display apparatus according to claim 1; and
a present position detector which detects a present position of the navigation apparatus;
wherein the map display apparatus displays in the bird's-eye view display a present position mark indicating the present position detected by present position detector.

29. A navigation apparatus according to claim 28, wherein the navigation apparatus is mounted in a vehicle; and wherein the present position detector detects the present position of the vehicle while the vehicle is at rest and in motion.

30. A map display apparatus comprising:
a map data memory which stores map data necessary for drawing a map of a predetermined region; and
a map display which reads map data out of the map data memory and draws a bird's-eye view display by projecting the map data read out from the map data memory onto a projection plane which makes a projection angle with a plane of the map data read out from the map data memory, the projection angle being greater than 0° and less than 90°;
wherein the map display displays an artificial sky area in a portion of the bird's-eye view display.

31. A map display apparatus according to claim 30, wherein the map display displays at least a portion of the artificial sky area in place of some of the map data read out from the map data memory to reduce an amount of map data which is displayed in the bird's-eye view display.

32. A map display apparatus according to claim 31, wherein the map display displays at least a portion of the artificial sky area in place of map data read out from the map data memory corresponding to a region of the bird's-eye view display which is furthest from a selected point in the bird's-eye view display to reduce an amount of map data which is displayed in the bird's-eye view display.

33. A map display apparatus according to claim 32, wherein the selected point in the bird's-eye view display is a present position of a user of the map display apparatus.

34. A map display apparatus according to claim 30, wherein the map display controls an appearance of the artificial sky area to represent a present appearance of an actual sky viewable by a user of the map display apparatus.

35. A map display apparatus according to claim 34 wherein the map display changes a color of the artificial sky area in accordance with an actual time of day experienced by the user of the map display apparatus.

36. A map display apparatus according to claim 34, wherein the map display changes a color of the artificial sky in accordance with a real weather condition experienced by the user of the map display apparatus.

37. A navigation apparatus comprising:
a map display apparatus according to claim 30; and
a present position detector which detects a present position of the navigation apparatus;
wherein the map display apparatus displays in the bird's-eye view display a present position mark indicating the present position detected by present position detector.

38. A navigation apparatus according to claim 37, wherein the navigation apparatus is mounted in a vehicle; and wherein the present position detector detects the present position of the vehicle when the vehicle is at rest and in motion.

39. A map display apparatus comprising:
memory means for storing map data necessary for drawing a map of a predetermined region;
map display means for displaying a bird's-eye view map by converting a perspective of map data read out from the memory means; and
background display means for displaying an artificial background region including a horizontal line and a sky in an upper region of the bird's-eye view map;
wherein the background display means changes at least one of a color and a pattern of the artificial background region in accordance with at least one ON/OFF state signal of equipment of a car.

40. A map display apparatus according to claim 39, wherein the background display means changes the at least one of the color and the pattern of the artificial background region in accordance with at least one ON/OFF state signal of lamps of the car.

41. A map display apparatus according to claim 39, wherein the background display means further changes the at least one of the color and the pattern of the artificial background region in accordance with time.

42. A map display apparatus according to claim 39, wherein the background display means further changes the at least one of the color and the pattern of the artificial background region in accordance with weather.

43. A map display apparatus comprising:

a memory which stores map data necessary for drawing a map of a predetermined region;

a map display which displays a bird's-eye view map by converting a perspective of map data read out from the memory; and a background display which displays an artificial background region including a horizontal line and a sky in an upper region of the bird's-eye view map;

wherein the background display changes at least one of a color and a pattern of the artificial background region in accordance with at least one ON/OFF state signal of equipment of a car.

44. A map display apparatus comprising:

memory means for storing map data necessary for drawing a map of a predetermined region;

map display means for displaying a bird's-eye view map by converting a perspective of map data read out from the memory means; and background display means for displaying an artificial background region including a horizontal line and a sky in an upper region of the bird's-eye view map;

wherein the background display means changes at least one of a color and a pattern of the artificial background region in accordance with a signal inputted from a car having the map display apparatus mounted thereto or an internal condition of the car.

45. A map display apparatus according to claim 44, wherein the signal inputted from the car is an ON/OFF state signal of equipment of the car or the internal condition of the car is an ON/OFF condition of equipment of the car.

46. A map display apparatus comprising:

a memory which stores map data necessary for drawing a map of a predetermined region;

a map display which displays a bird's-eye view map by converting a perspective of map data read out from the memory; and a background display which displays an artificial background region including a horizontal line and a sky in an upper region of the bird's-eye view map;

wherein the background display changes at least one of a color and a pattern of the artificial background region in accordance with a signal inputted from a car having the map display apparatus mounted thereto or an internal condition of the car.

47. A map display apparatus comprising:

a memory which stores map data necessary for drawing a map of a predetermined region;

a map display which displays a bird's-eye view map by converting a perspective of map data read out from the memory; and a background display which displays an artificial background region including a horizontal line and a sky in an upper region of the bird's-eye view map display;

wherein the background display changes at least one of a color and a pattern of the artificial background region in accordance with real present time.

48. A map display apparatus comprising:

a memory which stores map data necessary for drawing a map of a predetermined region;

a map display which displays a bird's-eye view map by converting a perspective of map data read out from the memory; and a background display which displays an artificial background region including a horizontal line and a sky in an upper region of the bird's-eye view map;

wherein the background display changes at least one of a color and a pattern of the artificial background region in accordance with received weather information about real present weather conditions.

49. A car navigation apparatus comprising:

a map data memory which stores map data;

a present position detector which detects a present position of a car;

a map display which reads out map data for a region including the present position of the car from the map data memory and displays a bird's-eye view map by converting a perspective of the map data read out from the map data memory;

a car position display controller which displays the present position of the car detected by the present position detector on the bird's-eye view map; and a background display which displays an artificial background including a sky in an upper region of the bird's-eye view map;

wherein the background display displays the sky with at least one of a color and a pattern representative of environmental conditions around the car in accordance with operational information of equipment of the car.

* * * * *